US009387929B2

(12) United States Patent
Gaillimore et al.

(10) Patent No.: US 9,387,929 B2
(45) Date of Patent: Jul. 12, 2016

(54) VERTICAL TAKEOFF AND LANDING ("VTOL") AIRCRAFT

(71) Applicants: Ian Todd Gaillimore, Kill Devil Hills, NC (US); Kenneth Dean Driver, Greensboro, NC (US)

(72) Inventors: Ian Todd Gaillimore, Kill Devil Hills, NC (US); Kenneth Dean Driver, Greensboro, NC (US)

( * ) Notice: Subject to any disclaimer, the term of this patent is extended or adjusted under 35 U.S.C. 154(b) by 128 days.

(21) Appl. No.: 13/843,163

(22) Filed: Mar. 15, 2013

(65) Prior Publication Data

US 2014/0339354 A1 Nov. 20, 2014

(51) Int. Cl.
*B64C 39/12* (2006.01)
*B64C 29/00* (2006.01)

(52) U.S. Cl.
CPC ............. *B64C 39/12* (2013.01); *B64C 29/0066* (2013.01)

(58) Field of Classification Search
CPC ..... B64C 29/0025; B64C 27/26; B64C 29/0033; B64C 39/062; B64C 39/12; B64C 29/0066
USPC ............ 244/12.3, 12.4, 12.5, 7 A, 7 R, 39, 48
See application file for complete search history.

(56) References Cited

U.S. PATENT DOCUMENTS

| 2,929,580 | A | * | 3/1960 | Ciolkosz | 244/12.5 |
| 3,987,981 | A | * | 10/1976 | Kook | 244/12.5 |
| 5,098,034 | A | * | 3/1992 | Lendriet | 244/39 |
| 8,720,814 | B2 | * | 5/2014 | Smith | 244/12.4 |
| 2006/0016930 | A1 | * | 1/2006 | Pak | A63H 27/14 244/12.4 |
| 2012/0043413 | A1 | * | 2/2012 | Smith | B64C 29/0033 244/12.4 |
| 2012/0280091 | A1 | * | 11/2012 | Saiz | 244/7 R |
| 2013/0062455 | A1 | * | 3/2013 | Lugg et al. | 244/12.3 |
| 2014/0239117 | A1 | * | 8/2014 | Sommer et al. | 244/48 |
| 2014/0312177 | A1 | * | 10/2014 | Gaonjur | 244/7 A |

* cited by examiner

*Primary Examiner* — Valentina Xavier
(74) *Attorney, Agent, or Firm* — Merek, Blackmon & Voorhees, LLC

(57) ABSTRACT

The invention is to an optionally piloted aircraft that can takeoff and land conventionally or vertically, and can convert between the two. The aircraft is immune to one or more engine failures during vertical flight through multiple engines and the use of a virtual nozzle. Aerodynamic controls are similarly redundant. Hovering flight is enabled with a novel stabilization system. Long range efficient cruise is achieved by turning off some engines in flight and sealing them into an aerodynamic fairing to achieve low drag. The resulting aircraft is capable of CTOL and VTOL, and is capable of converting between the two modes while in the air or on the ground. The aircraft can also be easily taxied on the ground in the conventional manner. Automatic controls considerably reduce the amount of training a pilot needs to fly and land the aircraft in either VTOL or CTOL mode.

14 Claims, 17 Drawing Sheets

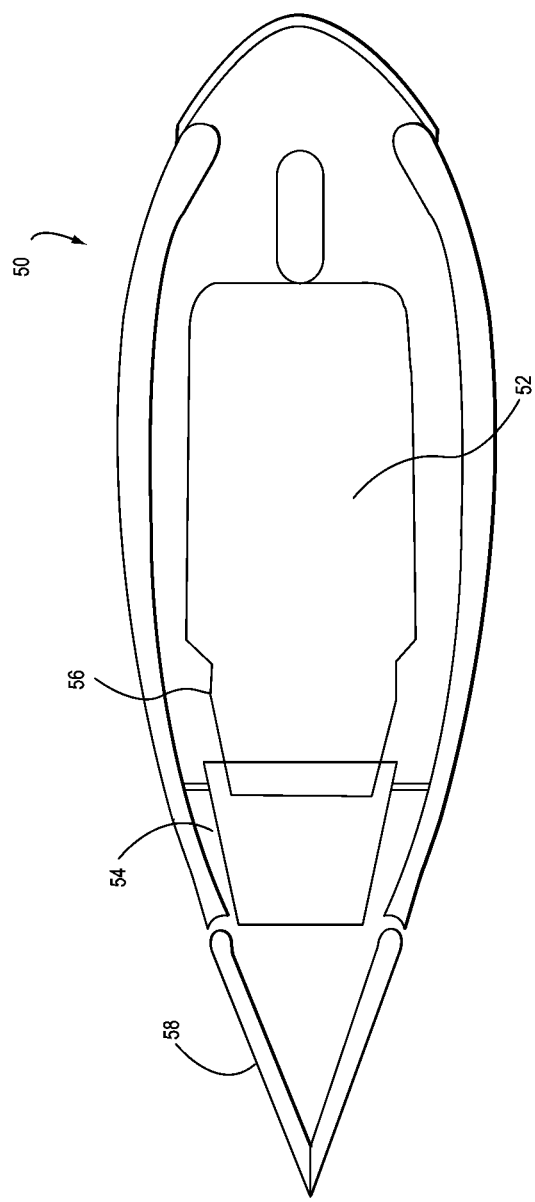

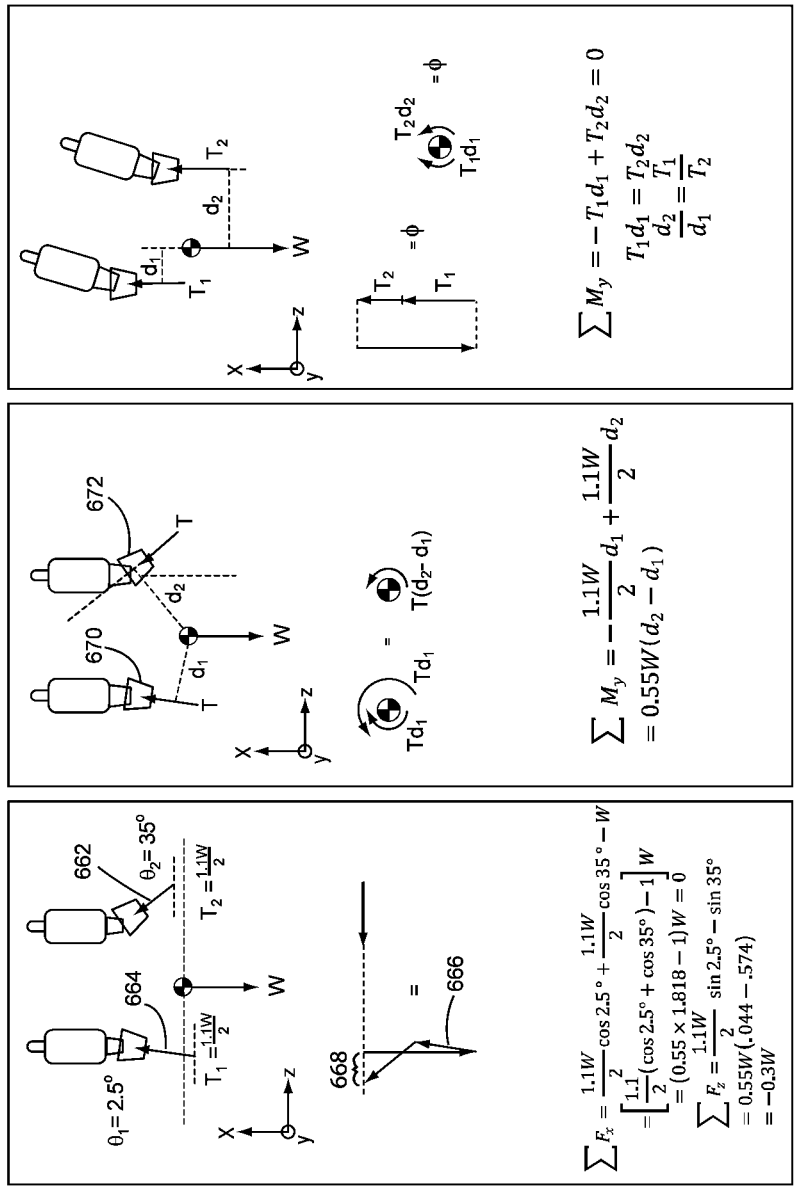

VERTICAL TAKEOFF AND LANDING ("VTOL") AIRCRAFT

BACKGROUND OF THE INVENTION

1. Field of the Invention

The present application relates to aircraft that can take off and land vertically and aircraft that are capable of tail-sitting or be oriented parallel to the ground on "tricycle" wheels.

2. Description of the Prior Art

OVERVIEW

Aircraft that can take off and land vertically, and travel at high speeds for long distances, would have great utility for moving people and materials. However, to date few aircraft capable of Vertical Takeoff or Landing ("VTOL") retain the ability to takeoff or land vertically following an engine failure, and no VTOL jet aircraft do so. A further significant problem with VTOL aircraft is the difficulty of maintaining precise control a) during the transition from horizontal to vertical flight and back, and b) during hover. These problems have prevented widespread commercial use of those VTOL aircraft, especially those that are capable of moderate to high-speed flight, such as tilt-rotor aircraft. The present invention described here addresses these problems through precision control of multiple engines used to create a virtual nozzle, among other novel features.

BACKGROUND

There are five basic types of aircraft can takeoff and land vertically, namely:
A. Helicopters
B. Tilt-rotor aircraft, such as the XV-15 or V-22 Osprey;
C. Jet VTOL aircraft, such as the AV-8B Harrier;
D. Jet/lift-fan aircraft, such as the F-23 Lightning II; and
E. Tail-sitting aircraft, such as the XFY-1 Pogo or XFV-1 Salmon.

Of these, only helicopters are in widespread commercial use today. Tilt-rotor, jet VTOL, lift-fan, and tail-sitting aircraft have been limited to experimental or military use owing to the risk of a crash following engine failure, and due to the difficulty of controlling the aircraft during both the ascent/descent phase and during the transition to and from vertical flight. As a result, commercial VTOL capability has been limited to helicopters, which are slow in comparison to jet and turboprop aircraft. However, helicopters have well known limitations and costs.

Among the basic types of VTOL aircraft listed above, tail-sitting aircraft were devised as a means to combine VTOL with high cruise speed and range. However, the most efficient tail-sitting aircraft use relatively large propellers in the vertical flight phase, similar to helicopters and tilt-rotor aircraft. These large rotors still prevent a conventional landing following an engine failure. Therefore tail-sitting aircraft that can only land in the tail-sitting configuration also exhibit a high risk of a crashing following an engine failure. The risk of crashing can be mitigated somewhat in jet or fan-powered aircraft (tail-sitting or otherwise) that can make a high-speed, run-on landing as conventional aircraft do; however, this then requires access to runways of adequate capability and proximity, and also requires the pilot to have had the significant training and practice required to perform run-on landings reliably. In any case, tail-sitting aircraft have been difficult or impossible to taxi on the ground.

An additional problem for VTOL aircraft in which lift is generated from jets or other non-rotary-wing methods is the need for secondary systems to control the aircraft attitude and trajectory. Control is typically provided using high-pressure air generated by the engine or by a separate compressor. Alternatively, moderate-pressure secondary airflow is created using fans, the flow of which may be modulated or re-directed to affect control. In either case, these secondary control systems unnecessarily increase the weight of the aircraft and the complexity of the control methods, which increases the potential for catastrophic failure. No VTOL aircraft at present integrates the entirety of the control method with the primary propulsive method, except in tilt-rotor aircraft, which suffer from the limitations described.

The present invention ameliorates these problems and provides additional advantages as describe hereunder by providing an aircraft with one or more of the following features:
A. Capable of VTOL following one or more engine failures;
B. Convertible at will from VTOL to Conventional Takeoff and Landing ("CTOL"), in flight and on the ground;
C. Easy to taxi on the ground before and after VTOL;
D. Easy to fly in VTOL and CTOL modes with minimal training;
E. Easy to transition to and from vertical flight with minimal training; and
F. Single integrated propulsion and hover control system, to reduce complexity and weight.

SUMMARY OF THE INVENTION

The invention according to at least one embodiment is to an optionally piloted aircraft that can takeoff and land conventionally or vertically, and that can convert between the two at will, on the ground or in flight. By design, the aircraft is immune to one or more engine failures during vertical flight. Aerodynamic controls are similarly redundant. Hovering flight is enabled with a novel stabilization system. Long range efficient cruise is achieved by turning off some engines in flight and sealing them into an aerodynamic fairing to achieve low drag.

This invention solves the problems of prior VTOL aircraft by integrating the entirety of the aircraft VTOL transition and hover control system with the means of propulsion in a way that is robust to engine failure, while providing for precision control in all phases of flight. The resulting aircraft is capable of both Conventional Takeoff or Landing (CTOL) and VTOL, and is capable of converting between the two modes at will while in the air or on the ground. The aircraft can also be easily taxied on the ground in the conventional manner. Automatic controls considerably reduce the amount of training a pilot needs to fly and land the aircraft in either VTOL or CTOL mode.

This invention solves the problem of combining VTOL with high cruise speed and range while mitigating the risk of crashing following an engine failure. The invention is applicable to a tail-sitting aircraft that rotates ninety degrees in pitch after takeoff in order to cruise efficiently; however, the invention can also be applied to more conventional aircraft that would takeoff, cruise, and land vertically in a near-level attitude at all times. In a more conventional embodiment, various schemes are envisioned to rotate the engines between the horizontal thrust and vertical thrust positions, versus rotating the entire aircraft.

Several novel features and objects of the invention, which may be used together or separately, are summarized as follows:

It is a principal object of one aspect of the invention to provide an aircraft having a novel, multiple engine configuration, wherein the effects of one or more engine failures may be mitigated by incorporating a relatively large number of smaller engines arranged in particular ways.

It is a further object of the invention to provide an aircraft utilizing a virtual nozzle to maneuver the aircraft in horizontal flight or vertical takeoff or landing.

It is another object of the invention to eliminate the need for a secondary control system during the transition between horizontal and vertical flight, and during hovering flight, by integrating the attitude and trajectory control with the propulsive system by adding thrust vectoring units to some or all of the multiple engines, and controlling the engines and thrust vectoring units in a coordinated fashion to form a virtual nozzle.

It is yet another object of the invention to provide increased aerodynamic flow around some or all of the engines through engine fairings. Because a large number of the engines may not be needed in conventional flight, fuel can be saved during cruise flight. Most of the engines can be turned off during flight to save fuel and then turned back on again prior to landing. To reduce the drag of any engines that are not running during cruise flight, each engine is enclosed in a fairing with moveable inlet and exhaust doors. These doors create a windward and a leeward stagnation point in the airflow, to streamline the flow in flight, providing a dramatic reduction in drag. This differentiates the inlet and exhaust doors from all other types of aircraft doors that do not create a stagnation point.

It is a further object of the invention to provide a novel lift stand on the aircraft. The inclusion of a "lift stand" provides the ability to lift the aircraft from the conventional stance to the tail-sitting stance on the ground before takeoff; and then after landing, to let the aircraft back down to the conventional stance from the tail-sitting stance. When the conversion from the tail-sitting stance to the conventional stance is not required, the function of the lift stand is similar to the kickstand on a bicycle. In the tail-sitting stance the aircraft rests on three or more points in contact with the ground. To take off, the aircraft uses the thrust vectoring function to balance on two points, or one point, before lifting from the ground. This is similar to first balancing a bicycle or unicycle on two wheels, or one wheel, before raising the kickstand and then riding away. In the conventional stance, the aircraft can be taxied on three or more wheels like any other aircraft. Depending on the geometry of the aircraft, the local ground surface, and surface winds, the vehicle may also be taxied in the lift stand position.

it is another object of the invention to provide a craft having one or more moving horizontal tails. Independent moving tail planes may be used to absorb the forces on landing, when landing in the tail-sitting stance. The tail planes may have a deep stroke to provide a softer and smoother landing event. This in turn allows the thrust vectoring system to better manage the landing dynamics. The tail planes include a fixed or adjustable passive spring-damper element, and may include an actuator element to actively manage ground forces applied through the tail planes during landing or takeoff. The value of a deep stroke in the tail planes is similar to an athlete being able to bend deep in the knees during physical activities that make balancing difficult.

It is a further object of the invention to provide an aircraft having multiple redundant aerodynamic control effectors. The reliability of aerodynamic control effectors is important to the safe operation of any aircraft. One way to increase the level of reliability is to increase the number of actuators per control effector; this typically requires slightly more powerful actuators so that the remaining working actuator can overpower the failed actuator. Another way to increase the reliability is to increase the number of control effectors performing the same function. This is typical when considering "left side, right side" control effectors such as left/right aileron, left/right stabilator, left/right elevon, etc. In contrast, the preferred embodiment splits a single control effector into multiple control effectors, each with an independent actuator. For example, while only one left elevon is needed to perform the left half of the elevon function, reliability is improved by splitting the single left elevon into more than one effector, e.g., six left elevons. Each left elevon segment then has an independent actuator. Failure of a single actuator only reduces the left elevon function by the inverse of the number of left elevon segments, i.e., ⅙th in the present example. The reduced surface area of each segment also means that a potentially much smaller actuator can be used. An added benefit of splitting a single effector into multiple effectors is that additional functions may be implemented. Using the example of the left elevon, the two outboard sections could be actuated in opposite directions to create drag, performing the aerodynamic function of a rudder for a tailless aircraft without a rudder, or performing the aerodynamic function of a speed brake. Further, one or more segments can be split into upper and lower sections so that a single segment could be deployed in "clamshell" fashion to perform the rudder and/or speed brake function. At the same time, all segments could be programmed to move in unison to perform the same function as the original single large elevon. Overall, the use of multiple redundant aerodynamic control effectors allows smaller, less reliable, less expensive actuators to be used without compromising reliability, yet while increasing overall utility of the same control effector volume, through the multi-function feature.

It is yet another object of the invention to provide a unique landing strut on a VTOL aircraft. A single shock-absorbing strut can be used as a single ground contact point during a takeoff or landing on a moving platform, such as a truck bed or ship at sea. The strut can include a non-skid pad and can be retractable. Similar to the moving tail planes, the strut may be passive or active.

It is also an object of the invention to provide an aircraft having a vertical tail. A traditional vertical tail may be included to improve directional stability in flight, and to prevent the aircraft from falling over backwards during the balance phase of a takeoff or landing event.

It is another object of the invention to provide an aircraft having a rotating pilot seat to orient the pilot in compatible positions during both horizontal flight and vertical takeoff and landing The pilot may be seated in a prone or near-prone position to maximize comfort during the VTOL phase of flight. The pilot seat may also rotate inside the aircraft. This would allow the pilot to takeoff or land in a comfortable forward leaning, upward position during the VTOL phase of flight, similar to the prone or near-prone position, and then to rotate using the seat into a more conventional aft-leaning, reclining position to maximize comfort during conventional cruise flight.

It is another object of the invention to provide a VTOL aircraft having full-time automatic control through multiply redundant control effectors that render negligible the probability that the failure of one or more control effectors will result in a loss of aircraft control. This also allows the aircraft to be flown with or without a pilot.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

FIGS. 3, 4A&B show a diagrammatic view of an engine, fairing, nozzle and paddles according to a preferred embodiment of the invention.

FIGS. 6A-J show the virtual nozzle effect of the multiple engines in which thrust vectoring from each propulsion module may be coordinated to modulate the magnitude and direction of net thrust applied to the vehicle.

Similar reference characters denote corresponding features consistently throughout the attached drawings.

DETAILED DESCRIPTION OF THE PREFERRED EMBODIMENT(S)

Figure 1:
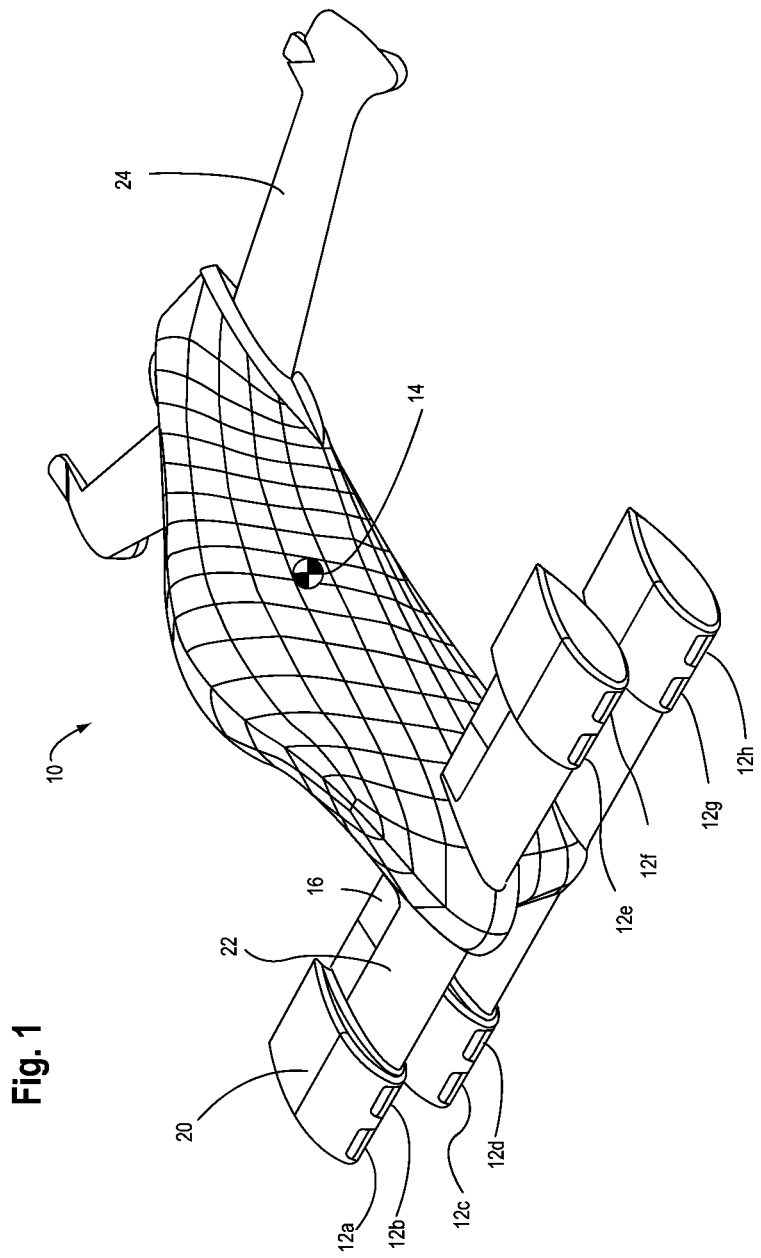
FIG. 1 shows a perspective view of an aircraft having multiple engines mounted to front canards according to a first embodiment. A single-pilot aircraft is shown; however, both unpiloted and multi-passenger aircraft of this configuration are also envisioned.

The preferred embodiment as shown in FIG. 1 is a tail-sitting aircraft 10 carrying at least one pilot. The aircraft can be flown without a pilot, or scaled up to larger size to carry more payload and passengers, given engines of sufficient thrust. The engines (12*a-h*) are mounted forward on the airplane so that the engine exhaust is as far as possible from the ground during takeoff and landing, among other objectives described hereunder. While eight engines are shown more engines or fewer engines may be used. When using turbines to generate thrust through the high-temperature combustion of fuel, this forward configuration minimizes the potential to burn the ground or nearby objects, which is a common problem with jet-powered VTOL aircraft. During near-hovering flight the normal position of the nozzles is such that exhaust is vectored away from the airplane, as will be described further hereunder. This exhaust direction also reduces the circulation of exhaust back up towards the engine intakes, where it might be re-ingested, which is another common problem with jet, fan, or rotary-wing VTOL aircraft. For jets, and when using other propulsive means, e.g., ducted fans with electric motors, this configuration also reduces the velocity of air impinging the ground, which can kick up loose objects such as small rocks or other material. A relatively large number of engines, up to twelve in some embodiments, are used to lift the craft in vertical flight and provide thrust in horizontal flight. Additional engines can be added to the canards, outboard of those shown, or at other locations that preserve the ability to lose thrust from one or more engines during vertical flight without catastrophic consequence (See FIGS. 2A-B). It should be noted that the engines could be mounted in individual pods, with various tradeoffs in total frontal and surface area, and interference drag due to pylons, etc.

Figure 5A:
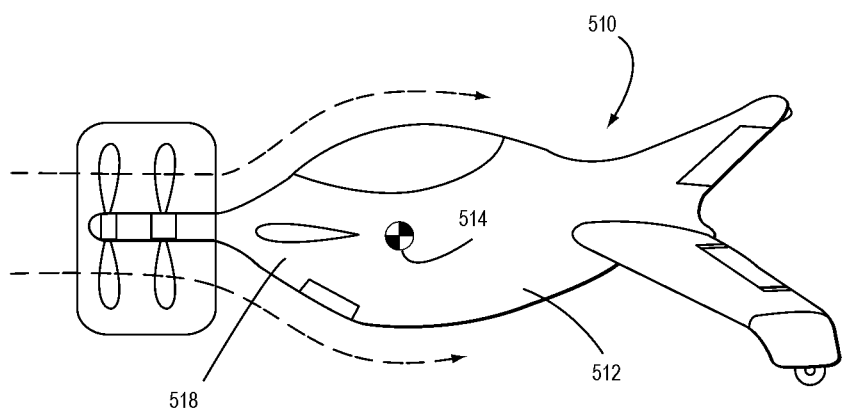
FIG. 5A-D show alternate configurations of aircraft having multiple engines and/or multiple fuselages.
Figure 5B:
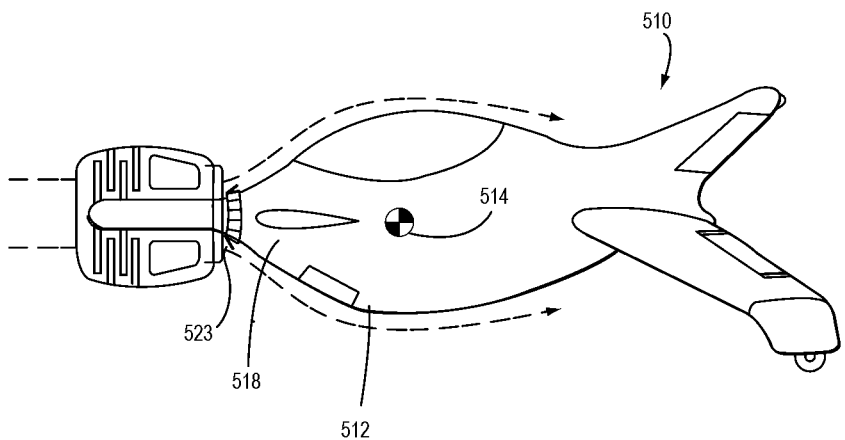

Ideally, for any VTOL aircraft, the thrust line for any lift-generating device (e.g., one or more engine) would pass through the center of gravity (514, FIGS. 5A-B) so that changes in lift during vertical flight would not induce changes in rotational moments that would have to be countered by other means, i.e., through coordination of changes in lift from other lift-generating devices (e.g., other engines or flight control surfaces), or through large counter-moments generated by a secondary control system, or via thrust vectoring. For a craft 510 having fuselage 512 with mass centrally distributed as shown in FIGS. 5A-B, the center of gravity 514 is within the fuselage as shown, and would therefore be within the thrust-generating flow field if centrally mounted engine(s) were ahead of the fuselage versus behind. This is common for propeller aircraft (especially in the tractor configuration), (FIG. 5A), but is inefficient for jet- or fan-powered aircraft (FIG. 5B) in which the flow velocities past the fuselage may be much higher than for propeller aircraft, thereby creating much higher drag owing to the square-law effect of relative velocity in the drag equation. This configuration does allow rotational moments to be generated by implementing flaps 523 surrounding the forward section of the fuselage just behind the fan or jet exhaust. These flaps are deployed outward in symmetrical annular fashion to reduce the net thrust along the direction the aircraft is pointing, or deployed in asymmetric modes to allow generation of rotational moments in particular direction; however, generation of any appreciable rolling moment would likely require either a) a complex flap configuration or b) a surface 518 parallel to the flow that could be deflected. A complex flap deployment would reduce the control power available for generating moments around all three axes simultaneously, in addition to impacting reliability. Adding a surface parallel to the flow amounts to adding a vane into the high speed flow that is always present, creating excess unnecessary drag, i.e., a similar problem to having the fuselage present in the high speed flow.

Figure 5C:
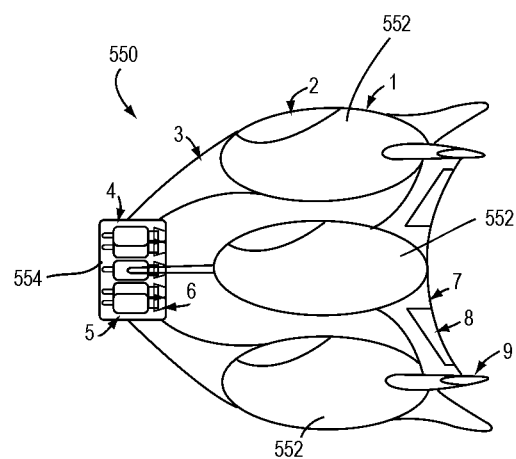
Figure 5D:
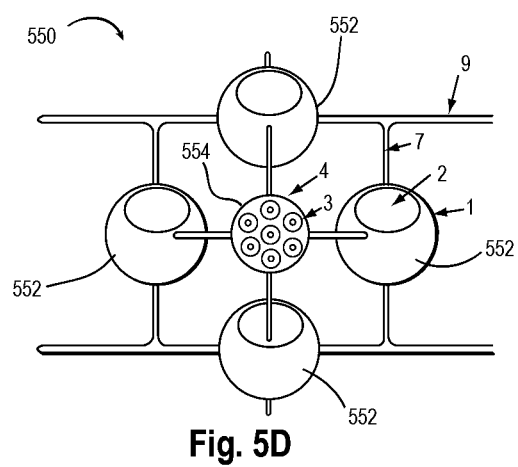

There are two primary ways to avoid continuous impingement of the thrust flow-field on the fuselage or vanes:

The first method to keep the fuselage out of the thrust flow field is to distribute the mass of the fuselage far away from the center of gravity, and there is a long history of engine placement away from the CG, for example in large multi-engine cargo aircraft; a key difference here being the grouping of engines away from the CG and the distribution of engines around the aircraft. Another example is shown in FIGS. 5C-D, through the use of two or more fuselage pods 552 (FIGS. 5C-D) on one craft 550. This would leave room for one large engine or many multiple engines 554 to pass their thrust lines through or very nearly through the center of gravity. While enabled by this invention, doing so creates at least four additional problems: a) sensitivity of the stability to the exact location of the center of gravity (which may be substantially affected by loading of fuel, passengers and materials); b) the larger required control forces, owing to the large rotational inertia created by the outboard fuselage pods; c) the difficulty in achieving conventional takeoff and/or landing capability, even as a backup operational mode; and d) the higher drag for the same surface area owing to aerodynamic interference between components. These problems can be addressed by vectoring the thrust and by locating the thrust-generating device forward or aft of the center of gravity as shown in the figures. For an aft-thrust configuration the vehicle would be dynamically unstable in vertical flight and would require artificial stabilization. Here dynamic instability means that, while the (static) balance point exists, any miniscule deviation from the balance point will result in the vehicle flipping over without some active control to stabilize it, i.e., like a ball in perfect balance on top of an upside down hemispherical bowl (or on top of another ball). In other words, the vehicle would not naturally return to the balance point. For a forward-thrust configuration (FIGS. 1-2A,B) the vehicle would be both statically and dynamically stable in vertical flight.

The second way to keep fuselage out of the thrust flow field is to move the engines (far) away from the center of gravity. In exchange for retaining the fuselage mass and volume near the overall center of gravity, this creates the opposite problem, namely, large rotational moments in the event of an engine failure, due to unbalanced moments from other engines. There are in turn two ways to solve this unbalance problem. The first is to employ enough engines that the loss of one or more engines can be compensated by increasing the thrust of nearby engines, thereby countering the moment from engines on the opposite side of the CG. This is an acceptable solution provided the total thrust by the remaining engines can achieve the thrust-to-weight required to climb in altitude at some pre-determined required rate. However, modulating the engine thrust directly may be impractical with existing turbojet machinery owing to the time required to accelerate the needed turbines to higher thrust ("hysteresis"), as the desired thrust level can take several seconds and longer to reach after the controls have been engaged to affect the change.

Figure 6A:
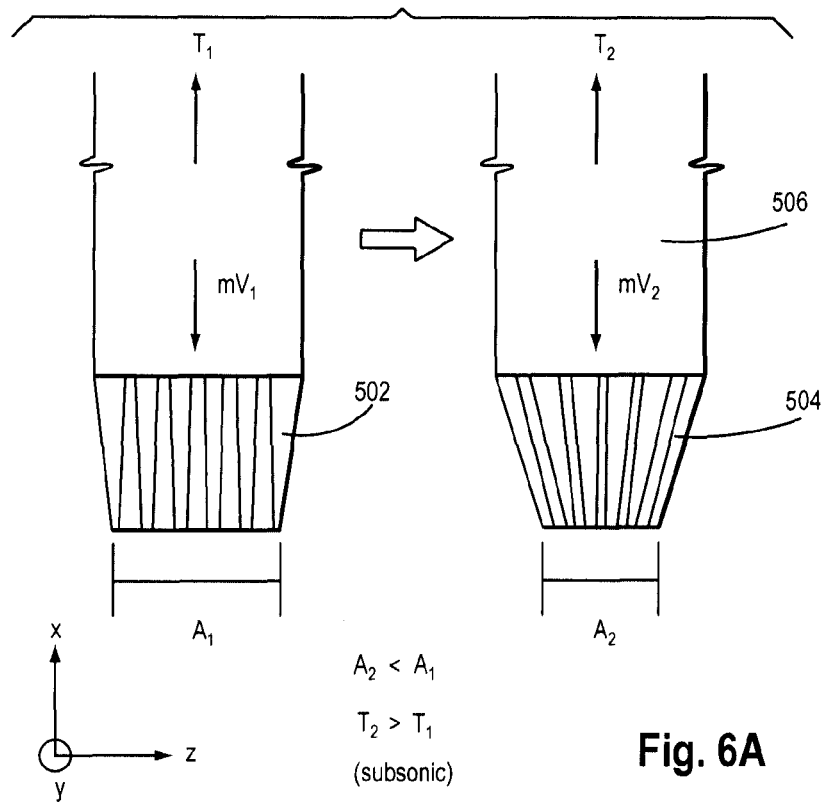

The second way to solve the unbalance problem of large rotational moments following an engine failure is to vector the thrust so that the sum total of all thrust (the net thrust line) effectively passes through the center of gravity in the vertical direction exactly opposite to gravity (FIG. 6J). In the case of aft-mounted engines, the result will still be dynamically unstable; continuous thrust vectoring could be used to stabilize the vehicle, and this configuration represents the classic "inverted pendulum" problem, like balancing a broom on the tip of one's finger. In the case of forward-mounted engines, the vehicle will be dynamically stable about a static trim point that is determined by the number and distance of the engines forward of the CG and the maximum nozzle angle (thrust vectoring) available; this is the preferred embodiment.

From the figures shown it is apparent that there are four general cases regarding the arrangement of the engines, the fuselage, and the propulsive slipstream or jet:
  A. Central fuselage, central engine(s)—many existing configurations (See FIGS. 5A-B);
  B. Distributed fuselage, central engine(s) (FIGS. 5C-D);
  C. Central fuselage, distributed engine(s)—this is the preferred embodiment as shown in FIG. 1 et seq.; and
  D. Distributed fuselage, distributed engine(s)—no example is known or hypothesized here.

The preferred embodiment provides the best overall operational, performance, controllability, and reliability tradeoffs between many competing issues that affect all four possible configurations.

Beyond the challenges of controlling the aircraft is the problem of achieving efficient cruise. Efficient cruise is best achieved through aerodynamic means employing the available atmosphere, in particular by using wings of large aspect ratio. The preferred embodiment reflects this reality and locates the engines forward of the center of gravity ("CG") 14 (FIG. 1) within fairings 20 at the tips of the canards 22. The arrangement achieves the objectives of distributing the thrust around and above the center of gravity 14 when in vertical flight, in a way that enables continued at least vertical flight following one or more engine failures; while at the same taking advantage of the wings of meaningful aspect ratio needed for efficient cruise flight. An aft-mounted horizontal tail 24 is provided to balance the aerodynamic moments in cruise flight, and functions in at least one embodiment as the landing gear during vertical takeoff or landing as will be described. Additional wing area (not shown) can be added outboard of the engine fairings using detachable wing panels, to improve aerodynamic performance, provided the additional lift can be balanced by the horizontal tail plane (perhaps also with detachable wing extensions) or by other means such as vectoring the thrust of those engines that are being used in cruise flight.

Finally, the layout of any aircraft is driven by a large number of tradeoffs that depend on the intended mission and the designer's objectives as reflected in the features incorporated or omitted from any particular model of that aircraft. Some layout elements important to the effective and efficient operation of the aircraft described here include:
  A) The CG is located approximately one-half the distance between the canards so that when the aircraft is in vertical flight the engines in one canard are in approximate balance with the engines in the other canard. Otherwise, large thrust vector angles would be needed to trim in vertical flight, reducing the thrust vector angles available to operate the virtual nozzle.
  B) The CG is located approximately one-quarter to two-thirds of the horizontal distance between the canards and tail planes when in horizontal flight in order increase the lever arms of the canards and tail planes. This increases the control power of the canards and tail planes and their respective flaps. Further, the thrust vectoring units are located forward of the CG by approximately one-quarter to three-quarters of the distance between the CG and the leading edge(s) of the canards, in order to increase the control power of the thrust vectoring units. Greater control power from the aerodynamic surfaces and the thrust vector units improves the ability to control the aircraft during the transition from horizontal to vertical flight (and back).
  C) The canards are located farther forward of the CG in comparison to the distance between the canards, in order to reduce the thrust vectoring deflection angles needed to balance the aircraft following one or more engine failures.
  D) The canards are staggered fore/aft relative to their average forward position from the CG, in order to reduce drag relative to an un-staggered arrangement; however, the stagger must not be too large because the stagger reduces the moment arm for the canard closer to the CG, requiring larger thrust vector angles from engines in that canard in order to balance thrust forces from the other canard, which has a longer moment arm.

E) The nose wheel must be sufficiently far forward of the CG to provide stability during ground handling and especially during hard braking that could otherwise cause the airplane to tip forward onto the nose or over the nose and onto its back ("cartwheel"). The nose wheel must also be forward of the CG to enable reliable operation of the lift stand.

F) The thrust vectoring units are located in the tips of the canards to increase the roll moment arms of the thrust vector units. This increases the roll control power available from thrust vectoring to help in the transition from horizontal to vertical flight (and back), during which aerodynamic controls may be less effective.

Description of Thrust Vectoring

The invention employs thrust vectoring in several new ways. Thrust vectoring is used for two primary functions: 1) providing primary control of the aircraft attitude and trajectory; and 2) managing the rotational moments generated following one or more engine failures. The particular method of thrust vectoring incorporates additional functions: A) closure of pitch thrust "paddles" to close the engine exhaust duct when that engine is not running in flight, creating a leeward stagnation point; B) opening and modulation of pitch thrust paddle position to generate aerodynamic forces whether the engine is on or off; C) partial closure of pitch thrust paddles to distribute flow across the exhaust exit area to reduce or eliminate the base drag that would otherwise result from the open areas where no jet exhaust would normally flow.

Figure 20:
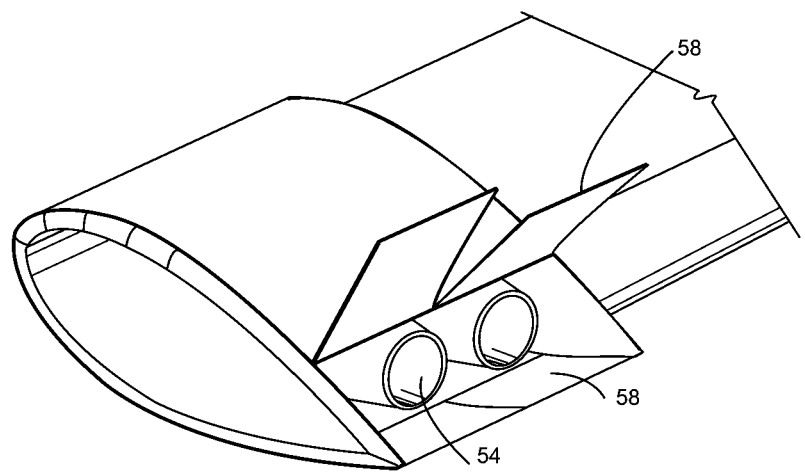
FIGS. 20 and 21 show a preferred configuration of the nozzle mounted to engine within the engine fairing.
Figure 21:
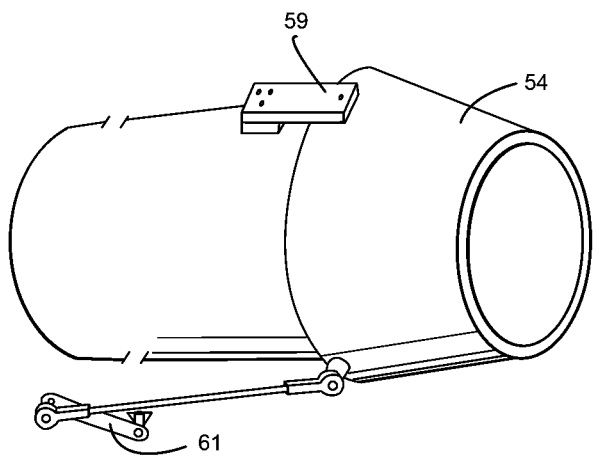

The thrust-vectoring system on each engine 52 (FIG. 3) consists of a yaw thrust vector nozzle 54 mounted downstream of the engine. 52. The nozzle 54 (FIG. 20) redirects thrust from the engine as the nozzle rotates relative to the vertical axis ("z axis") of the aircraft and to the flow of jet exhaust. The nozzle may move in more than one axes, but in a preferred embodiment pivots about yaw nozzle pivot 59 (FIG. 21). This provides the ability to generate side force along the y-axis of the aircraft, which can be used to stabilize the aircraft in yaw (about the z-axis) in both horizontal and vertical flight. An actuator 61 may be used to move the nozzle about the pivot 59 (one pivot preferably on each side of the nozzle).

Figure 4A:
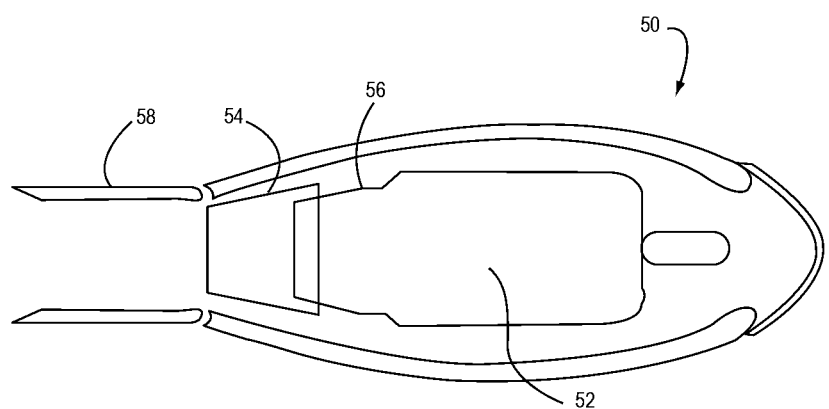
Figure 4B:
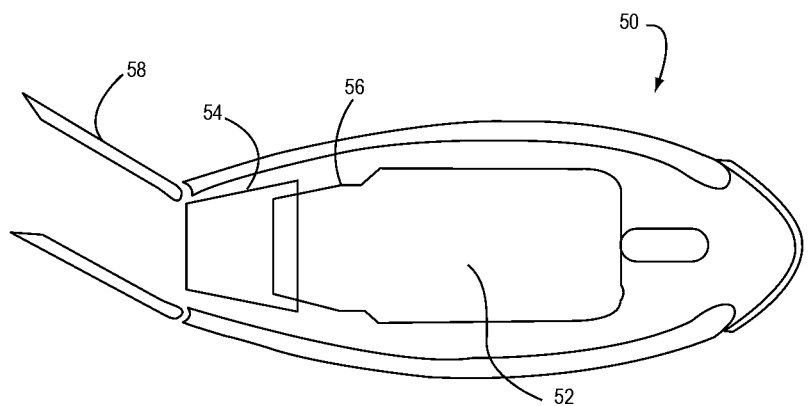

Aft of this nozzle are two paddles 58 (FIG. 20) that rotate about the y-axis of the aircraft (motion in the pitch axis). Whenever an engine is not running, these paddles can be closed (FIG. 3) to seal the aft-end of the nacelle, creating a stagnation point in the flow and reducing what would have been the base drag of the entire engine nacelle. Each paddle 58 can also be used as an aerodynamic effector (FIG. 4A), for example to create force along the z-axis of the airplane, to help control the aircraft in pitch and roll during horizontal flight, and during the transition to vertical flight. Finally, when the corresponding engine is running, each pitch paddle can deflect the jet exhaust flow to generate force along the z-axis of the aircraft (FIG. 4B, FIG. 20), to control the aircraft in pitch and roll in any phase of flight. In this way, the combination of the paddles and the nozzle can affect thrust along the y and z axes. Alternatively, a compound nozzle or paddle could be used to affect both the yaw and pitch control using for example a gimbal configuration.

Description of Virtual Nozzle

The response time required to change the thrust of jet turbine engines is notoriously slow. Depending on the design of the engine, it may take three to ten seconds for a jet turbine engine to achieve a new thrust setting in response to a new thrust command. Slow response times create "phase lag" in any control loop in which they appear, and have exponential effect on the phase delay versus frequency. This means that any control loop that includes the engine response time will be even slower to respond than the engine. For example, using jet thrust to control altitude when in vertical flight is notoriously difficult owing to engine response time and the resulting phase delay. This situation can be improved somewhat using a jet turbine with a nozzle of variable throat and exit area (FIG. 6A) that can more rapidly modulate the net thrust from the engine/nozzle combination; however, the amount of thrust variation that can be achieved using the nozzle alone is relatively small. In any case, a variable area nozzle is complex and heavy, and difficult to optimize over the full range of flow velocities from subsonic to supersonic, which require different configurations to efficiently modulate thrust.

This invention solves the problem of rapidly modulating thrust in the presence of slow jet turbine response times by employing a virtual nozzle, which in turn is enabled by the relatively large number of engines, each of which has two-axis thrust vectoring capability. A standard turbine nozzle operates by modulating the inlet, throat, and/or exhaust areas of the nozzle, causing the exhaust flow to accelerate or decelerate, in turn causing the thrust to increase or decrease for a constant mass flow rate (FIG. 6A) by opening the nozzle 502 or narrowing the nozzle 504 or a paddle of an engine 506. A virtual nozzle achieves an equivalent effect by vectoring the flow for each engine, which increases or decreases the velocity component of the exhaust flow along the (fixed) axis of the engine, thereby modulating the thrust contributed by that engine to the total thrust. It should be noted that the thrust vectoring effectors can be actuated with very fast response times, effectively negating the slow response time of the jet turbine. Vectoring the thrust has the side effect of creating a new force perpendicular to the flow. This is the established use of thrust vectoring, which is employed in the present invention as well. This perpendicular force must be balanced, and this is accomplished by another engine vectored in the opposite direction. This balancing process completes the virtual nozzle effect.

Figure 6D:
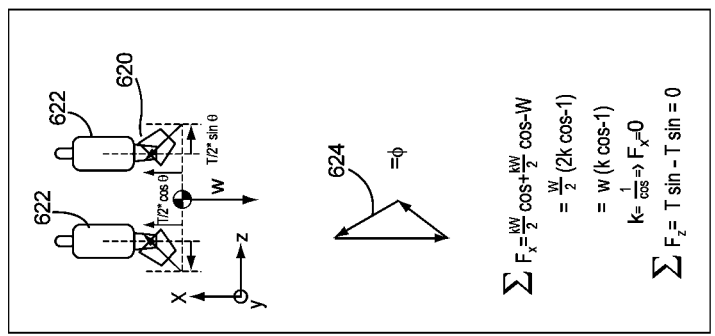
Figure 6C:
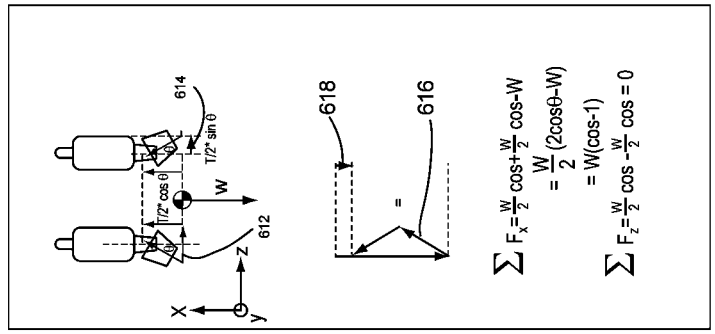

The action of the virtual nozzle and the attendant benefit to precision control along the thrust axis is accomplished using the thrust vectors as shown in FIG. 6a through 6J. The figures depict an idealized aircraft operating in two dimensions, horizontal and vertical axes, with two "planes" of engines, where the planes are perpendicular to the drawing page (along the y axis). FIGS. 7A&B is equivalent to looking at the side view of the aircraft shown in FIG. 1 in the tail-sitting or vertical flight orientation.

Figure 6B:
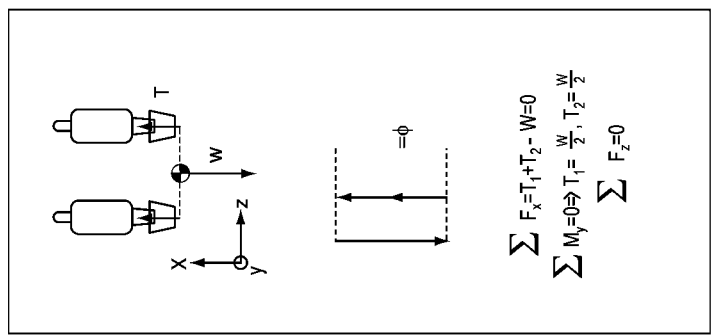

To operate the craft in a stable hover, the thrust created by the engine must equal ("counterbalance") the loaded weight of the craft (FIG. 6b). Natural variation in thrust will cause the aircraft to climb and descend in a random fashion. Further, to land the aircraft requires that the thrust be reduced (FIG. 6c) to initiate a descent, and then increased (FIG. 6e) to maintain the descent rate to within the landing structural limits of the airframe, and possibly increased further to slow the descent rate prior to touchdown. This is very difficult to achieve if the thrust of the engines is subject to very slow response times as described.

To provide the rapid response needed for precision control, the virtual nozzle is employed. The thrust of each engine is vectored away (FIG. 6c) from the normal position, which reduces the net effective thrust each engine along the longitudinal x-axis of the aircraft. This creates a side force component 612 (FIG. 6c) perpendicular to the flow, which is then balanced by the opposite engine at 614 (FIG. 6c). Small variations in this side force are rapidly balanced through continuous action of the thrust vectoring control system (virtual nozzle control system) which either measures the side force directly, or which measures the effect of the side force (i.e., through measures of linear acceleration and/or angular rate of the aircraft). The result of turning each nozzle outward is shown in the free body diagram 616, which sums the weight (W) and two thrust vectors in head-to-tail fashion. Total thrust along the longitudinal x-axis of the aircraft is less than the total weight by an amount shown by force vector 618, which causes the aircraft to accelerate downwardly along the "−x" axis.

It is clear from the previous discussion of FIG. 6c how the virtual nozzle may be employed to cause a VTOL aircraft to descend. It may be less clear how the virtual nozzle may be employed to cause a VTOL aircraft to climb. There are two primary ways. FIG. 6d shows that the aircraft weight (W) can be balanced with each nozzle 620 deflected outwardly by increasing the thrust of each engine 622 by some factor "k." For the configuration shown in FIG. 6d, it is obvious that to maintain unaccelerated flight with outward-pointing nozzles, k would be set to 1/cos(q), which is always equal to or greater than 1.0. This would exactly cancel the aircraft weight as shown in the free body diagram 624. The second primary way to achieve this is to set the total thrust from the engine to a value larger than the weight, and then to vector the nozzles outward to modulate the component of thrust along the longitudinal x-axis of the aircraft (FIGS. 6D through 6G). In this way, vectoring the engine exhaust can create a configuration where the thrust in the x direction is less than, equal to or greater than the weight of the craft to alternately lift, balance or lower the craft. This ability to control the craft using a virtual nozzle is a feature of the preferred embodiment.

Figure 6G:
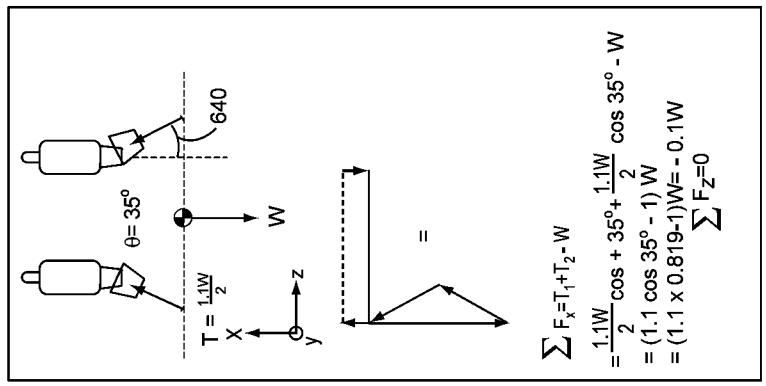
Figure 6F:
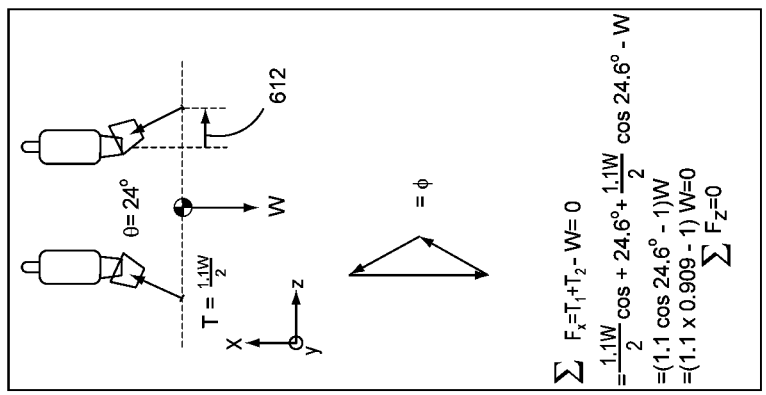
Figure 6E:
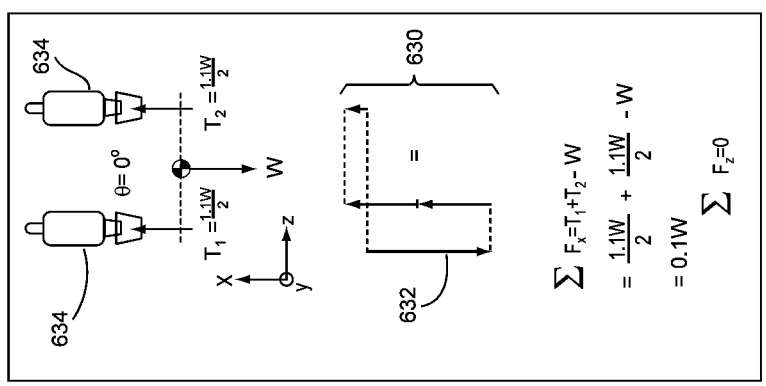
Figures 7A, 7B:
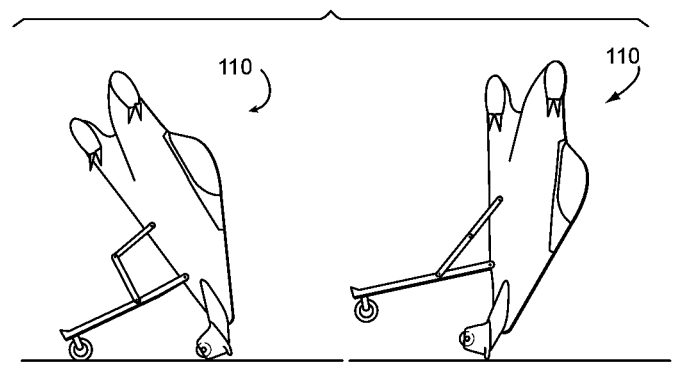
FIG. 7A-B show the aircraft according to a preferred aspect of the invention in the three point stance and the craft balanced on two points for takeoff and landing.

FIG. 6e shows an example where each engine is set to a thrust value of 10% greater than the aircraft weight (1.1*W) divided by the number of engines (2). At a nozzle angle of zero degrees (no vectoring), the total thrust 630 along the longitudinal x-axis of the aircraft (opposite gravity) exceeds the aircraft weight 632, causing the aircraft to accelerate upward. Note that the engines 634 may also be toed inwardly (not shown) to achieve the same effect, and this may be beneficial when considering great stagger between the canards and engine failures. For the purposes of this description, the two methods of directing thrusts inward are understood to be interchangeable and similarly when the description uses the "outward" terminology. Therefore in hovering flight at constant altitude the nozzles will be deflected in opposite directions by an amount required to achieve (net) thrust equal to weight, as shown in FIG. 6f. The advantage of this approach is that the engine thrust can be set to a constant value, while ascent and descent control are accomplished using only the nozzles, which as stated can be actuated very rapidly compared to altering the thrust of the engine to a new value.

To descend, the nozzle angle 640 will be further increased outwardly, as shown in FIG. 6g, which reduces the net thrust in the direction opposite to gravity, while allowing the engines to be held at a constant (high) thrust level. To climb, the nozzle angle (FIG. 6e) is decreased to eliminate the vectoring effect, thereby bringing the net flow into alignment with the usual un-deflected flow. When the nozzle angle is zero (nozzles parallel to usual flow), the higher effective thrust setting of the engine will cause the aircraft to accelerate upward (T/W>1.0). In this way, the engine can be set to a constant thrust that is above that required to maintain a hover, and the nozzles can be used to rapidly modulate the net thrust of the virtual nozzle to produce an ascent or descent acceleration by venting or "wasting" part of the thrust outwardly to alter the vertical component of the thrust. The range of T/W ratios that can be achieved is then a function of the maximum thrust-vectoring angle that can be affected.

The T/W ratio for the virtual nozzle is the cosine of the thrust vector angle (virtual nozzle angle) multiplied by the T/W ratio of the engine:

$$(T/W)_{net} = (T/W)_{engines} * K_{virtual\ nozzle}$$

For example, a maximum virtual nozzle angle of 35 degrees yields a minimum K factor for the virtual nozzle of K=cosine(35 deg)=0.82. This means that the maximum T/W from the engine for hovering flight, when the nozzle is at its widest setting, is 1/0.82=1.22. In that case, at any thrust setting above 1.22 T/W, the aircraft will accelerate upward (or at least hover) even at the maximum virtual nozzle angle of 35 degrees, since 1.22*0.82=1.0.

Conversely, at a more typical maximum T/W of 1.1, the net minimum T/W is (1.1)(0.82)=0.90. In that case, the nominal virtual nozzle angle for hovering flight is cos-1(1/1.1)=24.6 deg. Therefore with the engines set to full throttle (T/W=1.1) the nozzles must be deflected 24.6 deg to yield a net T/W of 1.0. To increase vertical acceleration, the nozzle angle is reduced; to descend, the nozzle angle is increased. Between the maximums of 35 deg and 0 deg, the net T/W can be very rapidly modulated from 0.9 to 1.1 to achieve precision, high bandwidth control.

By moving the virtual nozzle ahead of (or behind) the center of gravity, which creates a lever arm, the propulsion system can be used to generate rotational moments to control the aircraft angular rate and attitude. This is accomplished by adjusting the thrust vector angle of each engine so as to modulate the side force and the net thrust. In this way the secondary control system needed to control the aircraft in vertical flight (where aerodynamic controls are ineffective, for instance at low speeds) can be obviated by integrating the control function in a seamless manner with the primary propulsion system used to generate and modulate lift.

Several specific examples serve to illustrate the integration of primary control function with the propulsion function.

FIG. 6h shows the horizontal acceleration that can be produced with one nozzle 662 at full deflection (35 deg in this case). The angle of the other nozzle 664 is selected to exactly balance the net forces aligned with the gravity vector (namely, the aircraft weight W and the x-axis components of the vectored thrust). As shown in the equations, the other nozzle is deflected only 2.5 deg. The free body diagram 666 in head-to-tail fashion shows the net force 668 along the (−z) axis of the aircraft. This will cause the aircraft to translate over the ground perpendicular to gravity without climbing or descending.

FIG. 6i shows that these unequal nozzle deflections (670, 672) will also produce moments about the center of gravity, if the thrust settings are equal. These moments can be used to control the attitude acceleration, attitude rate, and attitude of the aircraft. Note that the horizontal acceleration and the moments are inextricably linked through the geometry of the aircraft. The degree of coupling is determined by the distance between the engines, the distance of the thrust vectoring unit ahead of or behind the center of gravity, and the myriad of different ways that the nozzle angles may be controlled to achieve different objectives. It should be clear that each design has benefits and drawbacks. The selection of the parameters for the nozzles and engine settings depends on the mission of the aircraft and the designer's objectives. For example, in cruise flight it may be desirable to operate the nozzles in unison to control aircraft attitude without much regard for the net thrust along the longitudinal x-axis of the aircraft (which would then be perpendicular to gravity). The variation in speed caused by the variations in net thrust would be controlled by a much slower loop used to control airspeed (slow enough for example to enable the pilot to close the airspeed loop manually). Alternatively, there may be various design objectives and different nozzle control modes during the transition from horizontal to vertical flight and back, and during the vertical flight phase.

One skilled in the art would appreciate that the same calculations above could be performed for the effect that the paddles have on the thrust components, or with the combination of nozzles and paddles (or other control element incorporating both features). Vectoring thrust in any direction away from the x-axis will reduce the amount of thrust along that line. Paddles may be used to offset each other in the same way as the nozzles or may grouped in various groups to provide a single virtual effect.

Compensating for Engine Failure

One objective of this invention is to preserve the vertical takeoff and landing capability following an engine failure. One means by which this can be accomplished using the virtual nozzle is shown in FIG. 6j. Consider the physical configuration as representing the side view of the airplane in FIG. 1 with a total of twelve engines in two planes of six engines each. If an engine in one plane fails, the maximum thrust available from that plane is reduced by a factor of (⅙th), or a factor of 1/12th considering the total set of engines. Each additional engine failure reduces the thrust available from that plane by the same factor. As shown in FIG. 6j, even after engine failures, it will be possible to trim the aircraft into vertical (jet-borne) flight using the virtual nozzle. The requirement for trimmed flight is that the forces and moments sum to zero. Provided that the thrust contributed from each plane of remaining engines (T1+T2) equals or exceeds the aircraft weight after accounting for any thrust vectoring, trimmed flight will be possible. The thrust vectoring will balance the moments. The ability for the aircraft to balance the moments will depend again on the distance between the nozzles along the vertical z-axis of the aircraft, and the distance of the nozzles ahead of or behind the center of gravity. For example, as the latter distance increases, a larger variation in d1 or d2 can be achieved for the same nozzle deflection away from zero. As shown, the condition for balancing the moments is that 2 be at least as large as T1d1/d2n. Therefore the ratios d1/d2 and T1/W, and the maximum nozzle angle, are critical to determining whether the aircraft can be trimmed and subsequently controlled during vertical flight.

As long as the maximum available vectoring angle is larger than the angle required for trim, the airplane can be trimmed into vertical flight following one more engine failures. Note that the airplane will tilt in the direction of the failed engine (or net of failed engines) if the nozzles are forward of the CG, and will tilt away from the failed engine if the nozzles are aft of the CG.

For aircraft that burn fuel in flight (versus electric aircraft that fly at constant weight), the total thrust needed to trim after burning fuel may be much less than at takeoff. For an aircraft with a large fuel mass fraction, the capability to land after engine failure(s) is considerable, and may require only relatively small nozzle angles depending on the specific failure conditions and the aircraft geometry. For example, an aircraft with a takeoff fuel mass fraction of 0.6, landing after burning off 0.55 of its mass in fuel, can suffer loss of one-half of the engines provided the nozzle angles are sufficient. For the configuration shown in FIG. 6j at this fuel mass fraction, loss of all engines along plane T2 would still enable vertical landing before fuel starvation, provided the maximum nozzle angle for engines along plane T1 were large enough to direct the engine thrust through the CG. In that case, moving the nozzles farther forward of the CG reduces the nozzle angle needed, at the expense of other tradeoffs. Many different limit conditions can be determined. It is obvious that the method for maintaining trim in the presence of engine failure(s) can be extended to multiple engine failures and to configurations in which the engines are unevenly distributed around the CG without any planes of symmetry. As with any other aircraft design, any final design will be the result of many such tradeoffs.

The virtual nozzle allows both functions (modulation of lift, and control of net torque) to operate at the same time through a control mixer. As with other control mixing schemes, each function "uses up" the available thrust vectoring as defined by the maximum thrust vector angle. Depending on the flight condition and the control commands, one or the other function may reach a limit, or may prevent the other function from reaching its full limit, as determined by the design of the mixer and mixer priorities. Therefore, as with traditional control schemes, there is a direct relationship between the achievable and repeatable flight envelope and the maximum travel of the thrust control effectors, in this case the virtual nozzle angle and the underlying maximum thrust vector angles for each engine.

Description of Engine Fairing

The thrust required to maintain conventional wing-borne flight is a fraction of the thrust required for VTOL operation. In the preferred embodiment, of the engines available, only two engines are required to cruise at the best-range airspeed, and only one engine is required to cruise at the maximum-endurance airspeed. Unfortunately the typical jet turbine engine is very inefficient at low thrust settings: the fuel burn rate at low throttle settings is still a large fraction of the fuel burn rate at the maximum throttle setting. Therefore, operating the extra engines at a lower power setting (perhaps a setting that exactly offsets the ram drag created by operating the engine) burns fuel too quickly; enough to dramatically reduce the maximum range of the aircraft. Turning the engines off is no help because the ram drag in the non-operating condition is a large fraction of the ram drag when the engine is operating.

Figure 8:
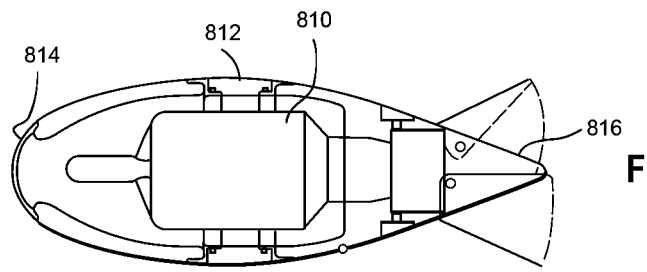
FIGS. 8-11 show diagrammatic breakout views of the engine fairing inlet doors and pitch doors.
Figure 9:
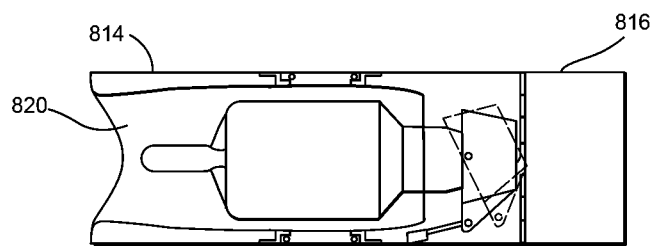

One preferred embodiment of the invention as shown in FIGS. 8-9 embeds the turbine 810 in a nacelle 812 with two sets of doors: a forward door 814 to cover the engine inlet, and two doors 816 to seal the exhaust. The forward inlet cover door 814 seals the inlet 820 in an aerodynamic way to streamline the flow around the engine, with a large reduction in drag. FIG. 8 shows the doors closed, and FIG. 9 shows the doors open. The exhaust doors 816 seal the exhaust duct aerodynamically, again streamlining the flow to yield a large reduction in drag. The exhaust doors 816 provide three additional functions: (1) they function as thrust-vectoring paddles (See FIG. 20); (2) they can function as aerodynamic control surfaces even when the engine is turned off; and (3) they can be used during cruise to "spread" the flow across the entire edge of the paddles, to eliminate the equivalent base drag from the excess exit area that is needed by the yaw nozzle for vectoring, but that is mostly unused in normal cruise flight.

Critically, both the forward inlet door 814, and the aft exhaust doors 816 (as a set), each create a stagnation point in the flow. This distinguishes their function from all other doors that do not create a stagnation point in the flow, i.e., any door that is oriented at an angle relative to the local flow. These stagnation points, and the aerodynamic shape of the nacelle, are responsible for the large reduction in drag versus any other means for reducing the fuel flow rate and/or drag of the engines. The doors may also protect the engine inlet from foreign objects when the inlet is covered.

Figure 10:
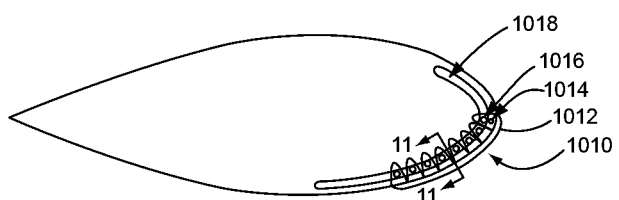
Figure 11:
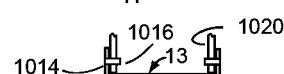

One such design for an engine fairing forward inlet door 1010 is shown in FIG. 10. An tracked, hinged or flexible door 1012 is provided for covering the inlet of the engine (810, FIG. 8). Each track of the inlet door is hinged to the next track. Each track has a tooth or flange 1014 having a pin 1016 or similar device for riding in a slot or guide 1018. When a motor or other control (not shown) activates the inlet door feature, the inlet door moves along parallel to the slot 1018 as the pin 1014 rides in the slot 1014 to direct the inlet door across the inlet opening (820, FIG. 9). Eventually the door will travel across the entire opening securing the interior of the fairing from the environment around the fairing. FIG. 11 shows a cross-section of a preferred embodiment of the inlet door 1012. The pins 1016 connect the flange 1014 of the inlet door to the structure 1020 defining the slot in which the pins ride. Because the slot is curved, the hinged or flexible door construction is needed to allow the door to change curvatures to mimic the curve of the slot. The invention does not depend on this particular configuration of the inlet door, and other structures may be used to accomplish the same task.

Figure 12B:
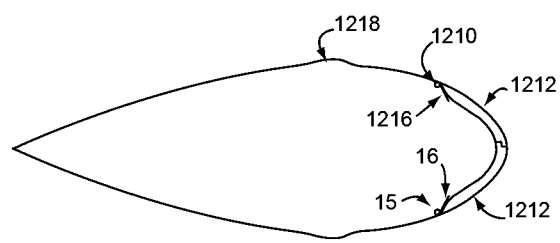
FIGS. 12A-B show diagrammatic breakout views of the engine fairing inlet doors according to a further embodiment.
Figure 12A:
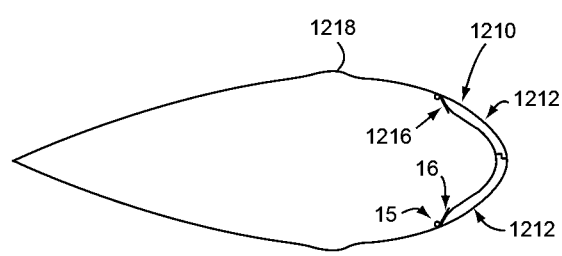

FIGS. 12A and 12B show an alternate configuration of an inlet door 1210. In this embodiment, clam shell type doors 1212 may be used to close together to seal the inlet of the engine. As shown in FIG. 12B, the doors may have a compound action such as retracting while opening and sliding along opposite sides of the fairing to slide away from the inlet while causing as little drag as possible. Additional structure such as a streamline bump 1218 or spring door 1216 may be provided to direct flow across any exposed surface caused by the door opening. The door 1216 may be spring loaded or hinged about a point 1210 to rotate outwardly to cover for instance the edge of the retracted inlet door 1212. A bump 1218 can be provided downstream of the door to provide to reduce turbulence downstream of the door by providing a more continuous contour when the door is in the retracted position. In this way the air stream will suffer minimum disruption ("turbulence") as it passes over the door.

The corresponding increase in maximum range, when using the nacelle with streamlining doors, can easily be a factor of five to ten or more. This takes a jet turbine airplane that might have a maximum range of 50 miles, and converts it into an aircraft with a practical range of 300 miles, turning an otherwise curious flying machine into an aircraft that provides a practical means of transporting people and goods relatively long distances at high speeds while retaining precision vertical takeoff and landing capability.

Finally it should be noted that the function and design of the engine fairing can be applied to many different types of propulsion, including jet turbines, turbofans, ducted fans driven by gas turbines, electric ducted fans, and similar. The prime difference among these methods of propulsion with regard to the engine fairing is the frontal area of the engine that must be streamlined when the engine is not running. Ducted fans (whether driven by gas turbine or electric motor) providing a larger exit area (lower "disk loading" when in vertical flight) will require a larger engine fairing, and may introduce additional challenges in preserving flow attachment over the nacelle; but the benefit to reducing drag and eliminating unnecessary fuel burn or power drain during cruise flight would still be considerable in comparison.

Description of Articulating Horizontal Tail

A significant problem with tail-sitting aircraft is providing landing gear that are robust to potentially high sink-rate landings, while also being both lightweight and capable of being streamlined into the aft section of the aircraft, where little to no cross-sectional area is available for streamlining. A design that could use the aft part of the aircraft as the landing gear would minimize weight and cross-sectional area, leaving shock absorbing as the remaining challenge.

Figure 13:
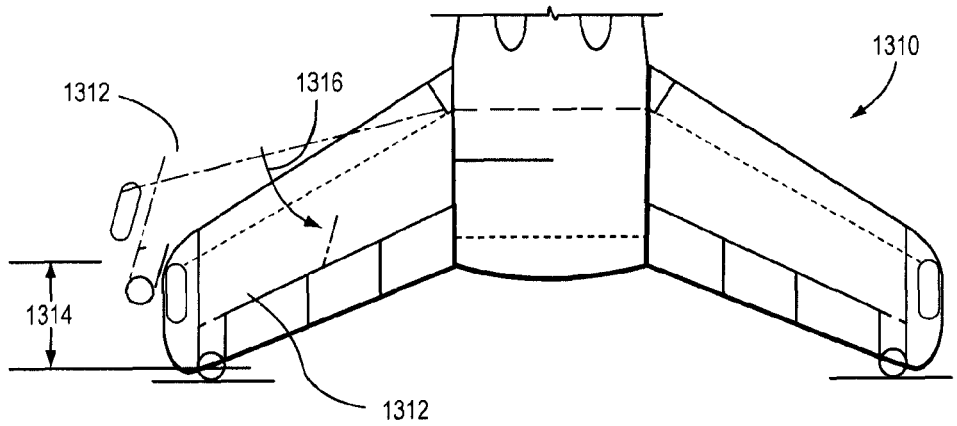
FIG. 13 shows a diagrammatic view of an articulating tail plane.

The preferred embodiment as shown in FIG. 13 shows an aircraft 1310 that sweeps the tail planes 1312 to create distance 1314 between the aft part of the fuselage and the ground when in the tail sitting mode. The tail planes then pivot 1316 about the leading edge of the tail plane at the intersection of the fuselage. On landing, a spring-damper strut 1412 (FIGS. 14-16) connected inside the fuselage 1410 and to the aft section 1414 of the tail plane 1416 allows the tail plane to swing forward, thereby absorbing energy during a high sink rate landing. The spring-damper functions as a stop if the maximum stroke is reached during a landing. The fuselage functions as a hard stop so that the tail planes can never sweep farther aft than the design flight position, while flight loads and the spring-damper force ensure that the tail planes will not swing forward in flight.

The ability to absorb energy during high sink rate landings serves three purposes. The first is to reduce the amount of shock loads that the structure must absorb during landings. The second is to reduce the bandwidth of control activity required to balance during the touchdown while the shock absorbing is in effect. This is because the relatively deep stroke of the tail plane motion allows the energy at touchdown to be absorbed over a longer period of time, reducing the required speed of response from the virtual nozzle and thrust vectoring system. The third is to reduce the accelerative forces on the occupants to improve pilot and passenger safety during a landing hard enough to break the airplane.

Figure 14:
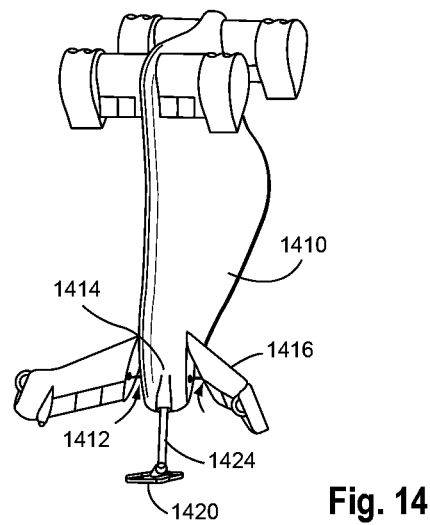
FIGS. 14-16 show views of the landing gear of the VTOL aircraft according to a preferred embodiment including an extendable landing strut.
Figures 15, 16:
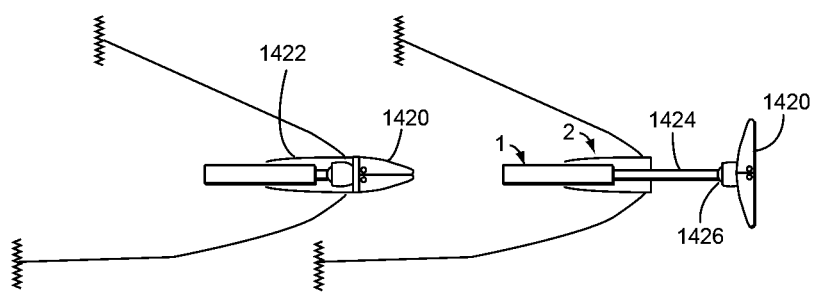
Figure 17A:
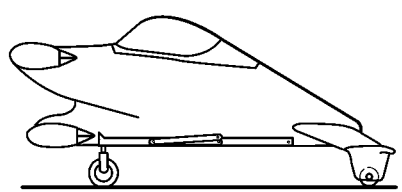
FIGS. 17A-D show diagrammatic views of a liftstand according to a preferred embodiment of the invention for use with a vertical landing aircraft.
Figure 17B:
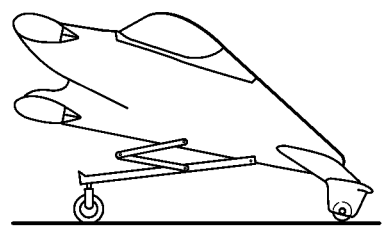
Figure 17C:
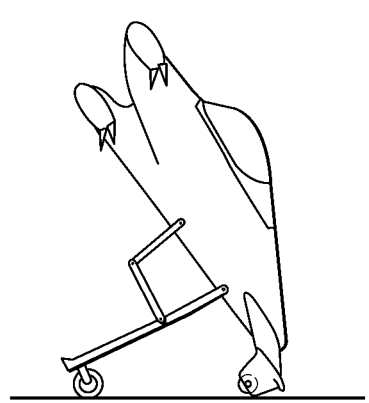
Figure 17D:
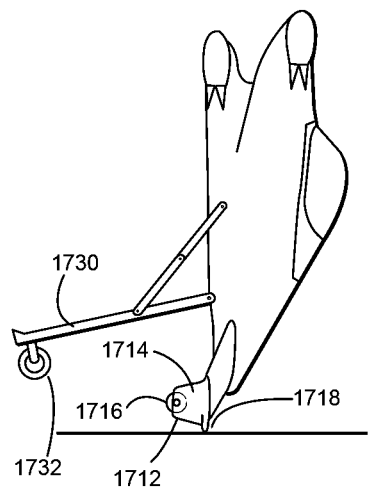

Additionally, a deployable landing pad may be used to assist with landing. A pad 1420 made of a high friction pad or a non-skid pad or a low friction pad can be extended outwardly from the aft section of the fuselage 1410. As shown in FIGS. 14-16, the landing pad may telescope from an internal pocket 1422. The pad 1420 may be hinged to unfold or rotate from a deployed position (FIG. 16) into a deployed position (FIG. 15) and extend outward on a telescoping shaft 1424 to an appropriate position below the craft as it is landing vertically. The deployment may be automatic or engaged by a manual control within the aircraft similar to tailhooks used on military craft. During landing, the pad 1420 contacts the ground first to provide several benefits. Firstly, the landing pad is attached to the craft through dampers or springs to lessen the forces of impact on the craft. Secondly, the contact of the landing pad may be used to alert the pilot or sensors in the craft so that the final preparations for landing can be made, such as ensuring that the tail planes are in the proper orientation. Thirdly, as the landing pad telescoping shaft 1424 is withdrawn into the craft, it provides a concrete indicator of the remaining distance to the ground. A ball joint 1426 (FIG. 15) or similar device may be used to assist the landing pad 1420 in maintain a secure contact when the ground is not precisely perpendicular to the telescoping shaft 1424. The ball joint 1426 allows the landing pad to rotate to an appropriate angle relative to the shaft 1424 without causing the shaft to undergo a large bending moment.

The retraction of the telescoping shaft into the craft may be passive, that is caused by the continued lowering of the weight on to the ground. Or the retraction may be facilitated or retarded by appropriate devices to control the descent of the craft in conjunction with the engine thrust. One skilled in the art would recognize the danger in retarding the descent without consideration of the thrust or the landing pad would add instability to the landing instead of facilitating landing. Further details of the landing on the liftstands of the tailplanes is described below.

Description of Liftstand and Landing Wheels

When a craft has landed on the tail of the aircraft, the craft is locked into a vertical position. A major problem that has prevented tail-sitting aircraft from being adopted more universally is the inability to taxi the craft safely and efficiently while in the vertical position. The present invention solves this problem by converting the aircraft from the tail-sitting position, to the conventional tricycle landing gear position, and vice-versa, using a liftstand. The liftstand is hinged at the back of the aircraft and extends well forward of the center of gravity of the aircraft at the ground contact point. The liftstand is extended using a scissor link or other suitable means that may be actuated manually or by any number of means including electrical, pneumatic, or hydraulic.

As shown in FIGS. 17A-D, the forward part of the liftstand 1730 may contact the ground directly using a surface (not shown) that is frictionless, such as a phenolic pad, or that generates friction, such as a non-skid pad. In the preferred embodiment, the forward part of the liftstand carries the nose wheel 1732, which serves as the ground contact point for the liftstand. The nose wheel may have a brake (not shown), which can be used to modulate the friction generated by the ground contact point of the liftstand. The nose wheel may include a steering function, and may also retract to reduce drag during cruise flight.

The complete landing gear system consists of the following four major elements:
A. Nose wheel;
B. Tail wheels;
C. Conversion pads; and
D. Touchdown wheels.

These four elements work in conjunction with the liftstand and the thrust vectoring system to effect the conversion from the conventional tricycle gear configuration to the tail-sitting configuration, and vice-versa. Each of these conversions is described here to illustrate the function of the major components.

During vertical landing, the aircraft first contacts the ground on the touchdown wheels 1718, which are mounted along the trailing edge of the tailplanes. The touchdown wheels may be rigidly mounted to the tailplanes, or may be mounted with a spring-damper system (not shown). The wheels 1718 are designed to provide frictionless operation in the lateral (y) axis of the aircraft, so that the distance between the contact points can increase (i.e, during flexing/settling of the tailplanes) while the tailplanes are absorbing landing loads. The use of wheels 1718 ensures that friction is generated in the axis perpendicular to the tailplanes, so that the aircraft does not slip during a hard landing.

Once the aircraft weight settles onto the two touchdown wheels and the aircraft is balancing using the thrust vector system (e.g., virtual nozzle, the composite result of the thrust vectors from all of the engines), the aircraft is ready to tilt over onto the liftstand 1730, which can be deployed during the balancing phase if it has not already been extended. The thrust vectoring system is used to tilt the aircraft over onto the liftstand by rotating the nozzles and/or paddles as necessary to tilt the aircraft in the proper direction, and to maintain control of the aircraft during the tilt process. As the aircraft tilts towards the liftstand from the vertical position (FIG. 17D) under thrust of the engines, the conversion pads 1712 (FIG. 17C) begin to bear weight. Weight continues to shift from the touchdown wheels 1718 to the conversion pads 1712 until the liftstand forward contact point (which may be the nose wheel 1732) is in contact with the ground. This tilt angle may be close to the maximum tilt angle that can be supported by the thrust vectoring system without the aircraft continuing to fall forward onto the liftstand. Further tilt of the aircraft will shift weight from the conversion pads to the tail wheels 1716. Depending on the parameters of a given design, the aircraft may carry all of the weight on the nose wheel and tail wheels when the liftstand is fully extended, or may bear some (or all) of the weight on the conversion pads. The conversion process continues by retracting the liftstand, which rotates the aircraft down onto the liftstand to a mostly horizontal position. Once in this position, the liftstand can be locked into place, and the aircraft is for all functional purposes, and outward appearances, a tricycle gear aircraft, which can be flown as a CTOL aircraft.

The process is performed in reverse to convert the aircraft from CTOL to VTOL. Critically, the angle when the liftstand is fully extended must be steep enough that the thrust vectoring system can safely and reliably tilt the aircraft up into the balance position in preparation for a vertical takeoff.

The craft may be provided with a vertical stabilizer or third tail plane at the rear of the craft that is stationary or deployable to allow the craft to land on three points instead of two so that the craft can be "parked" on the three landing points. Alternatively, the craft may be easily parked in the present configuration on two landing points and on the liftstand. Appropriate controls and/or sensors may assist the pilot or craft in transitioning from the two point landing onto the liftstand or during tilting of the liftstand to prevent the craft from tipping over or to help coordinate the thrust with the operation of the liftstand. For example, an appropriate amount of thrust may be used during lowering of the craft onto the liftstand and into the horizontal orientation to lessen the total load on the liftstand or to prevent the craft from tipping over during the reorientation.

Description of Optional Single Landing Strut

The aircraft in the preferred embodiment is particularly well suited for landing aboard a moving ship. The problem of "dynamic interface" for landing helicopters and other VTOL aircraft aboard ship is well known. Much of this difficulty derives from having three- or four-point landing gear that are relatively stiff even when they include spring-damper elements; and is considerably aggravated by gyroscopic forces for rotary-wing aircraft. Even after being initially established aboard ship after touchdown, a sudden and/or sweeping movement by the ship deck can introduce forces and moments large enough to cause an aircraft to roll over. Incidents and accidents are common in conditions of moderate to high ship motion. Many different types of mechanisms have been developed to deal with this problem, including latching grids on the deck, and a commonly used tether system for rotary wing aircraft that can winch a helicopter down onto the deck to secure it in place. The tether system has been effective but requires equipment to be built into the ship. In any case, accidents still occur.

Two features of the present invention help to address the problem of landing on a moving ship deck. The deep stroke provided by the all-moving tailplanes allows the airplane to absorb more of the ship motion and to absorb it more slowly than traditional landing gear, which in turn allows the aircraft control system to respond effectively to ship motion as it affects the aircraft. The ability to balance and tilt relative to the flight deck, in particular relative to the high motion axis of the ship (typically the roll axis), reduces the potential for excessive torque on the landing gear that can create a violent dynamic rollover. This is analogous to a person bending deep in the knees to better maintain balance during an athletic activity.

Adding a single strut (FIGS. 14-16) that serves as the single contact point for the initial touchdown can further enhance the ability to land aboard a moving platform. A single strut could be a permanently visible feature of the aircraft, extending from the aft fuselage area between the horizontal tails, much like a stinger on a wasp. The strut could also be retractable, and extended only when needed for landing on a moving platform (ship or moving vehicle). The single strut would employ at the ground contact end a fixed pad capable of generating high friction (i.e., non-skid pad), or a caster capable of modulating friction from zero (free-wheel in any horizontal direction) to the maximum available, which would be achieved by locking the caster with a brake, or modulating the friction generated by the caster using an anti-lock brake control system.

Use of the single strut would allow the aircraft to make contact with the moving platform in preparation for landing, which in turn would allow the thrust generated by the aircraft to be reduced to the level required for balancing versus hovering. Thrust vectoring would be used to maintain the aircraft in the vertical orientation regardless of the attitude of the moving platform, up to the limits of the combined strut and thrust vector system. This would allow the aircraft to complete the landing process in stages, using deep-stroke landing strut and/or articulating tailplanes to provide an opportunity for the thrust vectoring system to better manage the landing forces that can lead to a rollover accident. While operating at reduced thrust, the aircraft can sit for a longer period of time waiting for a "quiescent period" in which the platform may be very stable (very little motion) for 5 to 20 seconds, during with the final landing can be completed; namely, tilt of the aircraft onto the liftstand, and/or retraction of the liftstand to bring the aircraft to the conventional stance with low center of gravity position.

Description of Optional Vertical Tail

Figure 2A:
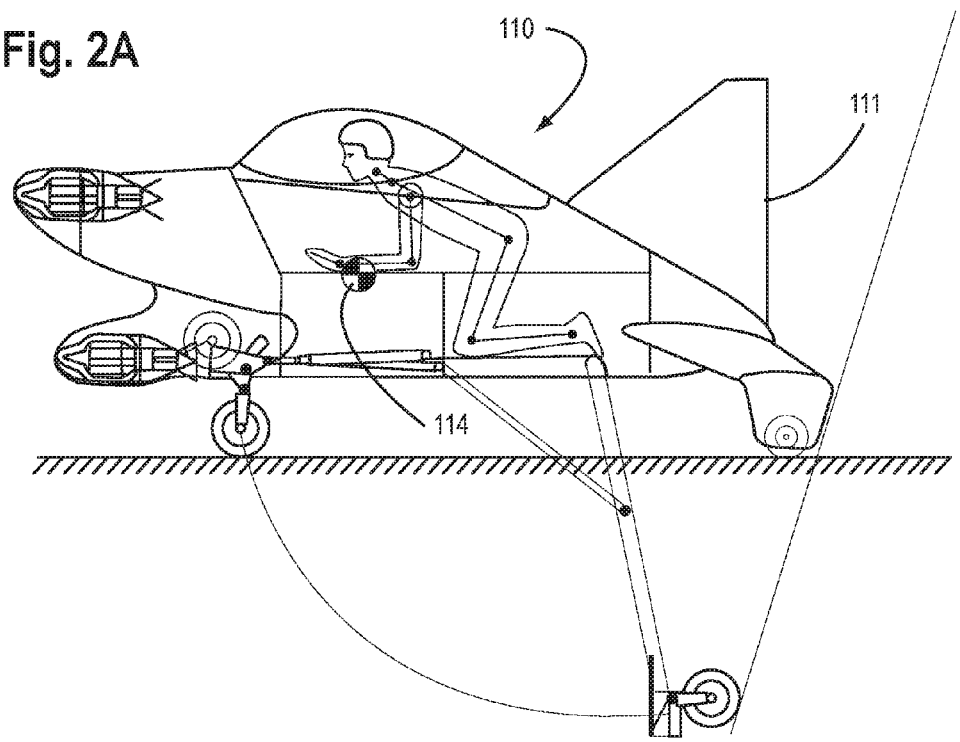
FIGS. 2A-C show side, top and front views of a VTOL aircraft according to a preferred embodiment of the invention.
Figure 2B:
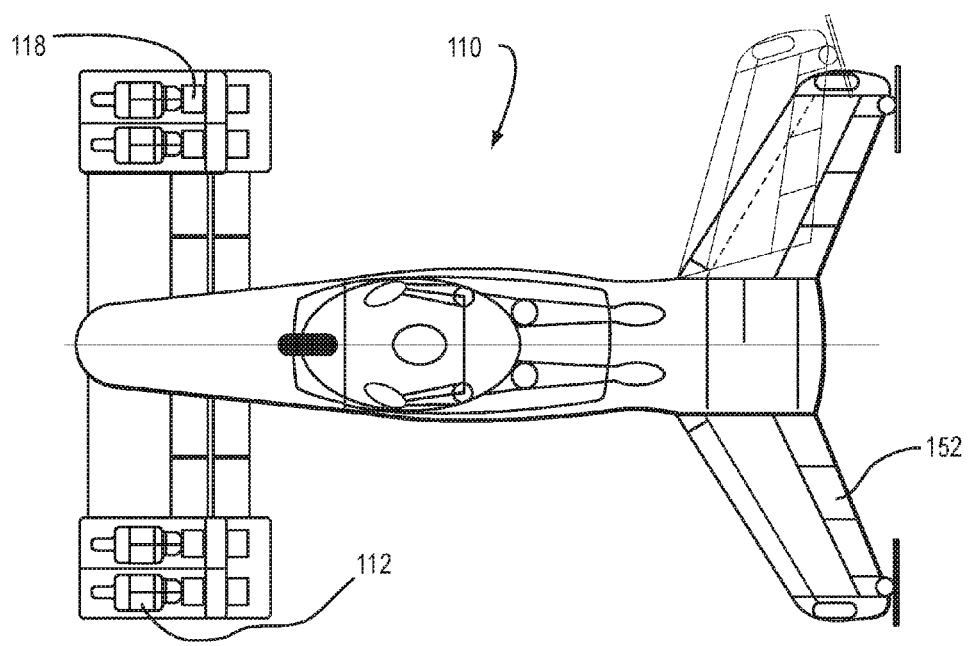
Figure 2C:
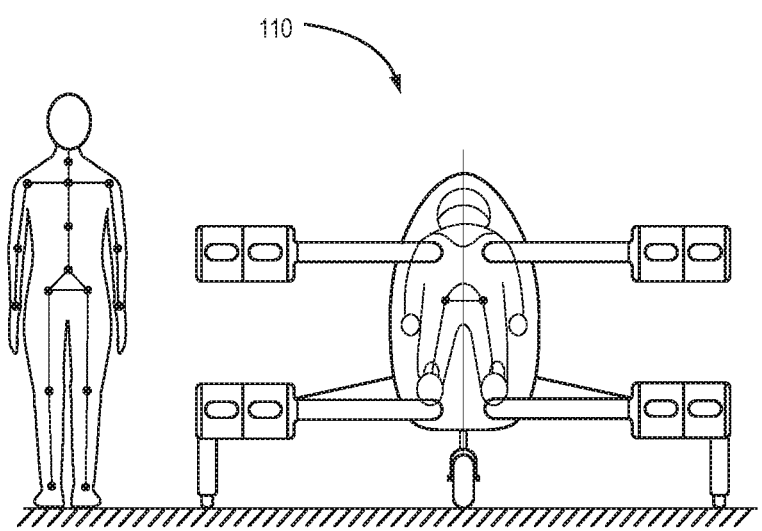

The airplane configuration as shown in FIGS. 1 and 2 is similar to a flying wing in that there is minimal vertical surface area to augment directional stability. Passive means of enhancing directional stability in flight include the use of anhedral in the tailplanes, and winglets on the tips of the tailplanes. The winglets also perform additional functions to relocate the tailwheels and contact pads to a more useful location below the bottom of the aircraft fuselage to enable conventional takeoffs and landings. Locating the center of gravity forward of the midpoint of the fuselage also helps to enhance directional stability using passive means.

Beyond passive methods, active means of enhancing directional stability and providing directional control include aerodynamic methods and thrust vectoring. From an aerodynamic view, the outboard control surfaces 152 on the tailplane can be built as a "clamshell" (e.g., two surfaces that hinge away from each other to open like a clam shell) that allows half of the surface to be deployed above the tailplane, and half below, creating drag on that side of the airplane (yaw moment) without creating a net rolling or pitching moment. This is similar to the design of the wingtip clamshells on the B-2 aircraft. A similar effect can be obtained using multiple independent control surfaces on a single tailplane deployed in a "split" fashion, in which an outboard surface may deflect upward while an inboard surface deflects downward. By scheduling the amount of deflection, again a yaw moment may be produced without a net roll or pitch moment. Finally, a yaw control surface could be added into the aft section of the winglet, keeping it clear of the touchdown wheels, conversion pads, and tail wheels. Thrust vectoring can also be used as an active way to enhance the directional stability and control of the aircraft during conventional flight.

Depending on the mission and operating envelope of the specific aircraft design it may be necessary to augment the inherent (passive) directional stability and control of the aircraft. In that case an optional vertical tail 111 may be added as shown in FIG. 2A.

The optional vertical tail would also enhance safety in the event the airplane falls over backwards during or following a landing. Several events could cause this event: 1) an excessively hard landing that causes the airplane to slip due to excessive force on the touchdown wheels; 2) fuel starvation that prevents thrust vectoring during the balance phase; 3) excessive environmental disturbances such as wind or turbulence; or 4) excessive platform motion if landing on a moving platform. A robust design will obviously preclude these risks to remote level (i.e., one in a million or less probability of occurrence per landing event). Nevertheless, the vertical tail and potentially a canopy bow would provide ground contact points that, on a level surface, would prevent the area under the canopy from contacting that surface directly or with high force, thereby protection the pilot to a greater degree.

Description of Optional Rotating Seat

Tail-sitting aircraft are uncomfortable for pilots to operate during the takeoff and landing phase when they are sitting in a position that is comfortable for cruising in horizontal flight. This is primarily because they cannot easily see the landing area during the descent phase, but also because motion cues can be confusing when lying on one's back. Aft-facing cameras could be pointed at the landing area during the descent; however, this is a less-than-optimal solution with current display technology, even if display symbols or other automation could compensate for the potentially confusing motion cues. Another way to solve the problem is to employ a forward-leaning position 1820 (FIG. 18) in horizontal cruise, such as when riding a racing motorcycle: the pilot would be in a reclining but mostly upright position 1824 during the descent, with potentially greater visibility and more natural motion cues. Even greater comfort and ease of perception in vertical flight is enabled when sitting in an inclined prone position during horizontal cruise flight, which yields a nearly vertical upright position during vertical flight, the preferred embodiment. From this position the pilot can easily look down and around the aircraft, and motion cues are most natural; however, this does not yield the most useful position in horizontal flight. This is primarily because the pilot cannot look in the direction of any maneuvers at high positive lift forces (positive G). On the other hand, maneuvers at high negative G are more comfortable in the near-prone position.

As with the basic geometry of the aircraft, the seating and visibility configuration of a particular aircraft will result from a potentially large number of tradeoffs.

Figure 19:
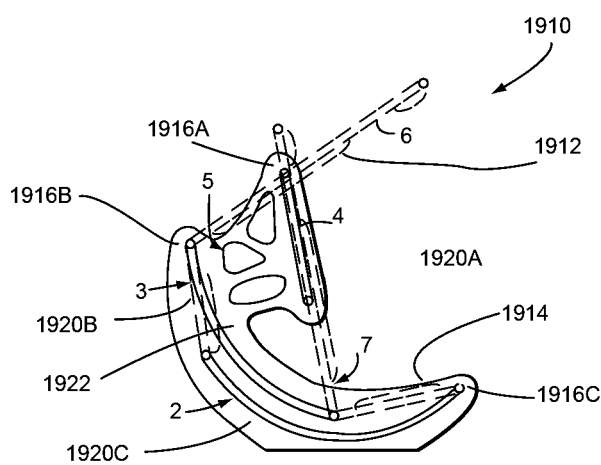

Another solution to the problem of optimizing visibility, perception, and comfort is to rotate the pilot's seat within the aircraft. This can be accomplished through various means including a single pivot point about which the seat rotates, or using combination rotating and sliding mechanism as shown in FIG. 19. A sliding element can be used to optimize the pilot's reach to the controls between the two positions. The degree of forward lean in the vertical flight position, and the degree of recline in the horizontal flight position, determines the required angular rotation and/or translation of the seat back and seat bottom. For a multi-place aircraft, the separation between seats would also determine whether all seats would rotate within the aircraft in synchronized fashion or independently, or not at all, and to what degree. In any case, the ability to rotate the seat inside the aircraft requires a more upright position on average than provided by the prone position, which increases the frontal and surface area of the aircraft, ultimately increasing drag. Again many tradeoffs affect whether an aircraft designed for a particular mission would include a rotating seat.

Figure 18:
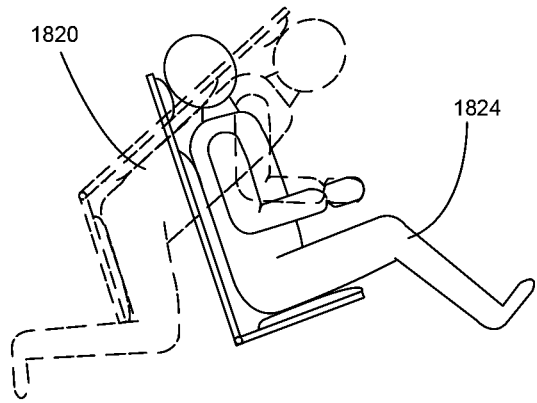
FIGS. 18 and 19 show a rotatable pilot seat for use with a preferred embodiment of the invention.

One design for the rotating seat 1910 is shown in FIGS. 18 & 19. The seat consists of two plates, a back plate 1912 and a bottom plate 1914, that are hinged together. These two plates have sets of pins 1916A-C that fit into slots 1920A-C respectively, inside frames 1922 that are used to capture the plates and to restrict their motion. The pins are in the following locations: 1) at the front edge of the bottom plate; 2) at the location of the hinge between bottom and back plates; and 3) at a point part way up the back plate, at a point that is lows enough to minimize the height of the side frame, but high enough to stabilize the back plate in any position. The kinematics of the plates are optimized to move the pilot from the forward-leaning position 1820 (FIG. 18) to the aft-leaning position 1824 while retaining the pilot's relationship to the cockpit controls, primarily the position of the hands. Because the bottom plate and back plate are hinged, the pins can each follow their own path. A simple spring-loaded, cable-operated latch (not shown) is used to lock the seat in the extreme positions; alternatively, a more complicated ratchet or friction mechanism may be used to lock the seat into any position between the extremes. To move from one position to another, the pilot unlocks the seat and uses his or her legs to push or pull his or her body (and therefore the seat) into a new position, where the seat is again locked. Alternatively, automated or powered systems could be used to move the seat as needed. The seat will follow the pilot best when the pilot is restrained to the seat using a seat belt, for example, a five-point restraint system.

Description of Control System

Manually controlling any aircraft in hover is notoriously difficult. Small tilt angles in the lift vector create horizontal accelerations that may not be aligned with the axes of the aircraft, nor aligned to the pilot's frame of reference. Furthermore, small tilt angles in a lift vector that is equal to the aircraft weight will create a downward vertical acceleration that will cause the aircraft to lose altitude. During manual control, when using a reversible control system, it can be very difficult for the pilot to figure out how to manipulate the controls to manage acceleration, velocity, position, and attitude. Extensive training and experience is typically required so that the pilot responses become automatic and unconscious. The best example of this difficulty is the amount of flight time pilots require to learn to hover a helicopter.

Stability and control augmentation systems comprising irreversible control systems have helped significantly with the hovering and transition flight tasks; however, challenges remain. One key challenge is that with the control inputs used the pilot often has different functions or effects on the aircraft according to the phase of flight. For example pilots may use pitch to control airspeed and thrust to control flight path, or vice versa, depending on the operating point within the flight envelope. For aircraft that transition in a level attitude from horizontal flight to vertical flight, the flight control inputs used by the pilot may have different meaning in hover than in horizontal flight. For example, the throttle (typically left hand) controls the aircraft along the z-axis in hover, and the along the x-axis in cruise flight; while the pitch and roll control (typically right hand) controls the longitudinal and lateral translation in hover, and attitude or short-term rate of climb in cruise flight. Pilots often report difficulty in adapting to these changes of function, and the most successful aircraft employ automatic flight control to assist in this transition.

For a tail-sitting aircraft it is possible to sidestep these problems in such a way that the left hand always controls acceleration or velocity along the longitudinal (x-axis) of the aircraft, and the right hand always controls attitude or net movement of the aircraft about the corresponding axis in the pilot's frame of reference. For example, fore-aft movement of the right hand would control pitch attitude or motion in the (x-z axes) pitch plane of symmetry; while left-right movement of the right hand would control rolling moment about the longitudinal (x-axis) of the aircraft. Foot pedal motion or rotation of the right-hand control stick would control yaw moment about the z-axis of the airplane, or motion in the (x-y axes) yaw plane of symmetry. In this way the pilot's control inputs have consistent effect throughout the flight envelope, with far more intuitive and natural operation in the vertical and hovering phase of flight.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

We claim:

1. A tail-sitting, vertical take-off aircraft, comprising:
a main fuselage having a front section at a nose of the aircraft, a tail section at the tail of the aircraft, and a center of gravity at a first position along said fuselage between said nose and said tail;
four canards mounted to said fuselage, said four canards mounted to said fuselage forward of said fuselage center of gravity;
two tail planes mounted in said tail section of said fuselage;
and an engine mounted on each canard, each said engine including an inlet and an outlet.

2. The aircraft according to claim 1, wherein the engine mounted on each canard is selected from the group of a jet, propeller, turbofan, turboprop, or electric engine.

3. The aircraft according to claim 1, wherein the engine mounted on each canard is mounted at an end of each canard remote from the fuselage of the aircraft.

4. The aircraft according to claim 1, wherein the engine mounted on each canard has a moveable nozzle for directing a portion of the thrust of the respective engine selectively in at an angle away from the engine, wherein said angle is in the range of 10-35 degrees.

5. The aircraft according to claim 4, wherein the engine mounted on each canard has a moveable paddle downstream of the nozzle for directing a portion of the thrust of the respective engine selectively in at an angle away from the engine.

6. The aircraft according to claim 1, wherein each canard has at least two engines mounted on the canard.

7. The aircraft according to claim 1, wherein at least one engine mounted to a canard includes an inlet and a forward door moveable between a first position for sealing the inlet to said engine from the air around said engine to prevent air from entering the engine during flight, and a second position for unsealing the inlet to allow air to enter the engine during flight.

8. The aircraft according to claim 7, wherein at least one engine mounted on a canard has a pair of moveable paddles downstream of the nozzle for directing a portion of the thrust of the respective engine selectively in at an angle away from the engine, wherein said angle is in the range of 10-35 degrees, and wherein each of the pair of paddles can be rotated into contact with the other of the pair of paddles to seal the outlet of the engine when said forward door is in said first position sealing said engine inlet.

9. The aircraft according to claim 5, wherein at least one of the canard-mounted engines includes an inlet and a forward door moveable between a first position for sealing the inlet to said engine from the air around said engine to prevent air from entering the engine during flight, and a second position for unsealing the inlet to allow air to enter the engine during flight.

10. The aircraft according to claim 1, including a liftstand system for lifting said aircraft from a first, taxiing position with said fuselage substantially parallel to the ground beneath the aircraft and a second, takeoff position with said fuselage raised at least 45 degrees relative to the ground.

11. The aircraft according to claim 10, wherein said liftstand system includes:
a tail wheel mounted to said tail section;
an elongated lift stand connecting a nose wheel to said aircraft;
a nose wheel connected to said liftstand for contacting the ground;
a motor for raising rotating said liftstand to move said from said taxiing position to said takeoff position about said nose wheel;
wherein when said aircraft is in said takeoff position, said tail planes contact the ground to support said tail planes on the ground to form a tail sitting aircraft, and
wherein said tail planes are hinged relative to said fuselage to absorb shock.

12. The aircraft according to claim 1, further comprising:
a rotating pilot seat comprising a seat having a back cushion mounted to a back plate and a seating pad mounted to a seat plate at a first angle;
a seat frame for selectively fixing said seat relative to said fuselage;
a seat rotator system for rotating said seat relative to said fuselage while maintaining the angle of said back plate relative to said seat plate at the first angle.

13. The aircraft according to claim 1, wherein at least one tail plane is connected to the fuselage by a spring damper strut to absorb shock during landing.

14. The aircraft according to claim 5, further comprising:
each canard mounted engine having a first selectively moveable exhaust control surface for controlling the yaw of the aircraft by directing a portion of the exhaust outwardly from a centerline of the engine; and
each canard mounted engine having a second selectively moveable exhaust control surface for controlling the pitch of the aircraft by directing a portion of the exhaust outwardly from a centerline of the engine.

* * * * *